US012013246B2

(12) United States Patent
Cope et al.

(10) Patent No.: US 12,013,246 B2
(45) Date of Patent: Jun. 18, 2024

(54) SYSTEMS AND METHODS OF MONITORING AND ANALYZING MULTIMODAL TRANSPORTATION USAGE

(71) Applicant: State Farm Mutual Automobile Insurance Company, Bloomington, IL (US)

(72) Inventors: Craig Cope, Bloomington, IL (US); Kristopher Keith Gaudin, Bloomington, IL (US); Ryan Gross, Normal, IL (US); Melissa C. Miles, Normal, IL (US); Jessica Lynn Shull, Bloomington, IL (US); Michael K. Cook, Carlock, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 677 days.

(21) Appl. No.: 17/095,067

(22) Filed: Nov. 11, 2020

(65) Prior Publication Data
US 2021/0063173 A1 Mar. 4, 2021

Related U.S. Application Data

(63) Continuation of application No. 16/182,703, filed on Nov. 7, 2018, now Pat. No. 10,895,463.
(Continued)

(51) Int. Cl.
*G01C 21/00* (2006.01)
*G01C 21/34* (2006.01)
(Continued)

(52) U.S. Cl.
CPC ..... *G01C 21/3438* (2013.01); *G01C 21/3484* (2013.01); *G06F 16/9537* (2019.01);
(Continued)

(58) Field of Classification Search
CPC ............ G01C 21/3438; G01C 21/3484; G01C 21/165; G06F 16/9537; G06F 40/169; G06Q 10/02; G06Q 40/08; G06Q 50/30
See application file for complete search history.

(56) References Cited

U.S. PATENT DOCUMENTS

| 4,360,875 A | 11/1982 | Behnke |
| 6,209,026 B1 | 3/2001 | Ran et al. |

(Continued)

OTHER PUBLICATIONS

Botea, et al., DOCIT: An Integrated System for Risk-Averse Multimodal Journey Advising, Smart Cities and Homes, Ch. 16, 2016, pp. 345-359 (Year: 2016).
(Continued)

*Primary Examiner* — Adam M Alharbi
(74) *Attorney, Agent, or Firm* — Lee & Hayes, P.C.

(57) ABSTRACT

Systems and methods relating to usage of multimodal transportation systems are disclosed. Such systems and methods may identify available local transportation modes for a user, such as vehicle-sharing, ridesharing, rental vehicles, taxicabs, owned vehicles, or public transit options. The available transportation modes may be compared, and recommendations may be presented to the user. Routes may be identified, compared, or recommended to a user, and scheduling or ticket purchasing may be facilitated. With user permission, user transportation data may be collected via a smartphone to identify user transportation patterns and preferences, thereby improving recommendations regarding and assessment of user transportation. Information regarding risks or other relevant factors associated with various transportation modes may be assessed for a user based upon typical characteristics of user transportation choices over a plurality of transportation scenarios, which may be indicated by a user transportation profile.

20 Claims, 11 Drawing Sheets

Related U.S. Application Data

(60) Provisional application No. 62/621,546, filed on Jan. 24, 2018, provisional application No. 62/621,538, filed on Jan. 24, 2018, provisional application No. 62/621,542, filed on Jan. 24, 2018.

(51) Int. Cl.

| | | |
|---|---|---|
| *G06F 16/9537* | (2019.01) | |
| *G06F 40/169* | (2020.01) | |
| *G06Q 10/02* | (2012.01) | |
| *G06Q 40/08* | (2012.01) | |
| *G06Q 50/40* | (2024.01) | |
| *G01C 21/16* | (2006.01) | |

(52) U.S. Cl.
CPC .......... *G06F 40/169* (2020.01); *G06Q 10/02* (2013.01); *G06Q 40/08* (2013.01); *G06Q 50/40* (2024.01); *G01C 21/165* (2013.01)

(56) References Cited

U.S. PATENT DOCUMENTS

| | | | |
|---|---|---|---|
| 6,266,614 B1 | 7/2001 | Alumbaugh | |
| 7,480,567 B2 | 1/2009 | Suomela et al. | |
| 7,840,427 B2 | 11/2010 | O'Sullivan | |
| 8,731,768 B2 | 5/2014 | Fernandes et al. | |
| 8,935,036 B1 | 1/2015 | Christensen et al. | |
| 9,067,565 B2 | 6/2015 | McClellan et al. | |
| 9,454,786 B1 | 9/2016 | Srey et al. | |
| 10,157,422 B2 * | 12/2018 | Jordan Peters .... | G06Q 30/0207 |
| 10,395,526 B1 | 8/2019 | Slusar | |
| 10,627,831 B2 | 4/2020 | Hayes et al. | |
| 10,643,292 B1 | 5/2020 | Gorman-Ladd et al. | |
| 2004/0049424 A1 | 3/2004 | Murray et al. | |
| 2005/0182722 A1 | 8/2005 | Meyer et al. | |
| 2008/0182564 A1 | 7/2008 | Frank et al. | |
| 2010/0030586 A1 | 2/2010 | Taylor et al. | |
| 2010/0036599 A1 | 2/2010 | Froeberg et al. | |
| 2010/0106534 A1 | 4/2010 | Robinson et al. | |
| 2012/0072243 A1 | 3/2012 | Collins et al. | |
| 2012/0136567 A1 | 5/2012 | Wang et al. | |
| 2012/0209632 A1 | 8/2012 | Kaminski et al. | |
| 2012/0296885 A1 | 11/2012 | Gontmakher et al. | |
| 2013/0046456 A1 | 2/2013 | Scofield et al. | |
| 2013/0117057 A1 | 5/2013 | Van et al. | |
| 2013/0157647 A1 | 6/2013 | Kolodziej | |
| 2013/0198031 A1 | 8/2013 | Mitchell et al. | |
| 2013/0238241 A1 | 9/2013 | Chelotti et al. | |
| 2013/0262222 A1 | 10/2013 | Gibson et al. | |
| 2014/0089101 A1 | 3/2014 | Meller | |
| 2014/0207497 A1 | 7/2014 | Collins et al. | |
| 2014/0222330 A1 | 8/2014 | Kohlenberg et al. | |
| 2014/0278071 A1 | 9/2014 | San et al. | |
| 2014/0372154 A1 | 12/2014 | Scott | |
| 2015/0032366 A1 | 1/2015 | Man et al. | |
| 2015/0058047 A1 | 2/2015 | Turk et al. | |
| 2015/0079923 A1 | 3/2015 | McNeil | |
| 2015/0170287 A1 | 6/2015 | Tirone et al. | |
| 2015/0187016 A1 | 7/2015 | Adams et al. | |
| 2015/0294422 A1 | 10/2015 | Carver et al. | |
| 2015/0346727 A1 | 12/2015 | Ramanujam | |
| 2016/0003637 A1 | 1/2016 | Andersen | |
| 2016/0086285 A1 | 3/2016 | Jordan et al. | |
| 2016/0086393 A1 | 3/2016 | Collins et al. | |
| 2016/0167652 A1 | 6/2016 | Slusar | |
| 2016/0171521 A1 | 6/2016 | Ramirez et al. | |
| 2016/0189306 A1 | 6/2016 | Bogovich et al. | |
| 2016/0364678 A1 | 12/2016 | Cao | |
| 2017/0021764 A1 | 1/2017 | Adams et al. | |
| 2017/0140652 A1 | 5/2017 | Hodges et al. | |
| 2017/0153714 A1 | 6/2017 | Gao et al. | |
| 2017/0169366 A1 | 6/2017 | Klein et al. | |
| 2017/0213273 A1 | 7/2017 | Dietrich et al. | |
| 2017/0228410 A1 | 8/2017 | Slusar | |
| 2017/0278312 A1 | 9/2017 | Minster et al. | |
| 2017/0286884 A1 * | 10/2017 | Shoval .......... | G06Q 10/063114 |
| 2017/0365030 A1 | 12/2017 | Shoham et al. | |
| 2017/0365169 A1 | 12/2017 | Tennent et al. | |
| 2018/0046182 A1 | 2/2018 | Joyce et al. | |
| 2018/0060827 A1 | 3/2018 | Abbas et al. | |
| 2018/0061230 A1 | 3/2018 | Madigan et al. | |
| 2018/0075380 A1 | 3/2018 | Perl et al. | |
| 2018/0114148 A1 | 4/2018 | Balaji et al. | |
| 2018/0188043 A1 | 7/2018 | Chen et al. | |
| 2018/0315146 A1 | 11/2018 | Matthiesen et al. | |
| 2018/0341881 A1 | 11/2018 | Kislovskiy et al. | |
| 2018/0374002 A1 | 12/2018 | Li | |
| 2019/0039545 A1 | 2/2019 | Kumar et al. | |
| 2019/0143994 A1 | 5/2019 | Chen | |
| 2019/0347951 A1 | 11/2019 | MacQuarrie et al. | |
| 2020/0182637 A1 | 6/2020 | Kumar et al. | |

OTHER PUBLICATIONS

Basu, et al., Automated Mobility-on-Demand vs. Mass Transit: A Multi-Modal Activity-Driven Agent-Based Simulation Approach, Transportation Research Record, 2018, vol. 2672(8), pp. 608-618 (Year: 2018).

Vilko, et al., Risk assessment in multimodal supply chains, International Journal of Production Economics, vol. 140, No. 2, Dec. 2012, pp. 586-595 (Year: 2012).

* cited by examiner

SYSTEMS AND METHODS OF MONITORING AND ANALYZING MULTIMODAL TRANSPORTATION USAGE

CROSS REFERENCE TO RELATED APPLICATIONS

This present disclosure is a continuation of U.S. patent application Ser. No. 16/182,703, filed Nov. 7, 2018, which claims the benefit of U.S. Provisional Application No. 62/621,538 (filed Jan. 24, 2018), U.S. Provisional Application No. 62/621,542 (filed Jan. 24, 2018), and U.S. Provisional Application No. 62/621,546 (filed Jan. 24, 2018), all of which are hereby incorporated herein by reference in their entirety.

TECHNICAL FIELD

The present disclosure generally relates to systems and methods for monitoring and managing use of multiple transportation modes in a multimodal transportation network.

BACKGROUND

Modern transportation systems are becoming increasing complex, providing travelers with a bewildering array of transportation options. Such complexity may provide flexibility for travelers and greatly improve overall efficiency through use of transportation modes best suited to various purposes. Travelers may utilize several different transportation modes to complete a trip along a route, and the combination of modes may vary depending upon traffic, weather, time constraints, or other factors. While such flexibility may generally benefit users of such multimodal transportation systems, difficulties may exist in identifying available transportation options (e.g., locating available shared vehicles or ridesharing routes), using the corresponding transportation modes (e.g., scheduling or contracting usage), and/or evaluating or comparing options (e.g., comparing cost, time, or risk associated with various combinations of transportation modes).

As an example of the complexity in such multimodal transportation systems, a traveler may drive a personal vehicle to a commuter train station, take a commuter train to a second station, contract a ride from a transportation network company (TNC) to a meeting, ride a vehicle-share bicycle from a docking station near the meeting to another docking station near the second train station, take a train back to the first train station, and drive the personal vehicle home in the evening with other passengers scheduled through a ridesharing network, stopping along the way to drop off the other passengers. Meanwhile, the personal vehicle may have been lent during the day to someone who may have scheduled use of the vehicle through a vehicle-sharing network that collects a fee for usage, part of which may be sent to the vehicle owner. If the vehicle is an autonomous vehicle, it may have left the station and refueled or recharged at some point during the day.

Vehicle-sharing may refer to the use of a vehicle by multiple users at different times. For example, bicycle-sharing networks may allow users to check out a bicycle from one docking station, and return it to another docking station. Ridesharing may refer to the sharing of a vehicle so that more than one person travels in the vehicle, and prevents the need for others to have to drive to a location themselves. By having more people using one vehicle, carpooling may reduce each person's travel costs such as: fuel costs, tolls, and the stress of driving. Vehicle-sharing and ridesharing may also be a more environmentally friendly and sustainable way to travel as sharing trips reduces air pollution, carbon emissions, traffic congestion on the roads, and the need for parking spaces. Vehicle-sharing and ridesharing may be particularly popular among family members, but commercial networks enable scheduling of such sharing among the general public.

SUMMARY

The present embodiments relate to monitoring and managing use of multiple transportation modes by one or more users of a multimodal transportation network or system. The embodiments may include accessing information and identifying available transportation options for the user, which may be limited by user-specific preferences or criteria. The embodiments may similarly include automatically monitoring user travel to determine user transportation mode usage, which may be determined based upon telematics data patterns and/or additional data associated with the user (e.g., ticket purchase data). The data collected regarding user transportation mode usage may indicate various user transportation scenarios (i.e., use of transportation modes under certain transportation environment conditions) and may further be evaluated to generate a user transportation profile indicating typical characteristics of user transportation. Additional, fewer, or alternative features described herein below may be included in some aspects.

In one aspect, a computer related method for generating user transportation options may be provided. The method may include: (1) generating location data indicating a current location of a mobile computing device (or other computing device); (2) receiving a destination location indicating the end point of a user trip; (3) identifying a plurality of transportation options for travel between the current location and the destination location, including a plurality of transportation modes available in a geographic area including the current location; (4) determining a transportation risk corresponding to each of the plurality of transportation options, wherein each of the plurality of transportation options may be associated with at least one segment of a route between the current location and destination; and/or (5) generating a user interface for presentation to a user via a display of the mobile computing device. The user interface may comprise: (i) a plurality of transportation option indicators representing a set of the plurality of transportation options; (ii) at least one risk indicator associated with at least one of the transportation option indicators to indicate the transportation risk corresponding to the transportation options associated with the at least one of the transportation option indicators; and/or (iii) a transportation option selector associated with each of the plurality of transportation option indicators. The location data may be generated by a geolocation unit of a mobile computing device associated with a user. The method may include additional, less, or alternate functionality or actions, including those discussed elsewhere herein.

For instance, the transportation modes may include a plurality of the following: trains, airplanes, ride-share vehicles, taxis, self-driving vehicles (such as autonomous or semi-autonomous vehicles), bikes, or walking. In some embodiments, the method may further include identifying a plurality of routes from the current location to the destination location, wherein each of the plurality of routes may include one of the plurality of transportation options along each segment of the route. The user interface may then include a plurality of route indicators representing a set of the plurality of routes. Likewise, the user interface may include a route insurance purchase option enabling the user to purchase an insurance policy for a single trip along one of the plurality of routes.

In some embodiments, the selection of the transportation option selector associated with one of the plurality of transportation option indicators may cause the user interface to display at least one purchase option indicator enabling the user to purchase access to the transportation option associated with the transportation option indicator. In further embodiments, the selection of the transportation option selector associated with one of the plurality of transportation option indicators may cause the user interface to display at least one reservation option indicator associated with the transportation option associated with the transportation option indicator. The reservation option indicator may indicate the availability of the transportation option and/or enable the user to reserve access to the transportation option. In some embodiments, the transportation option may be a shared automobile.

In some embodiments, the method may further include acquiring current environmental data associated with the plurality of transportation options. Determining the transportation risk corresponding to each of the plurality of transportation options may then include determining the transportation risk based in part upon the current environmental data. The at least one risk indicator may indicate one or more recommended transportation options based upon the determined transportation risk associated with each of the plurality of transportation options. In further embodiments, the method may further include accessing user profile data, which may include information regarding assets of a user or insurance coverage levels associated with the user. A multimodal transportation insurance policy may be generated for the user based upon the user profile data and a user selection of the transportation option selector associated with one of the plurality of transportation option indicators.

In another aspect, a computer implemented method of monitoring multimodal transportation usage of a user of a mobile computing device may be provided. Such mobile computing device may include a smartphone or other computing device. The method may include: (1) collecting geolocation data regarding a plurality of user locations and corresponding times associated with a user trip by the user; (2) identifying an area associated with the user trip based upon the geolocation data; (3) accessing transit route data associated with a plurality of transit route segments for a plurality of transportation modes in the area: (4) calculating user movement data from user location and time data; and/or (5) identifying a user route taken by the user based upon the user movement data and the transit route data. The user route may include one or more of the plurality of transit route segments. The geolocation data may be generated by a geolocation unit of a mobile computing device associated with a user. The method may include additional, less, or alternate functionality, including that discussed elsewhere herein.

For instance, in some embodiments, identifying the user route may include identifying at least one of the transit route segments in the user route taken by the user by identifying a plurality of locations at which the user is stopped for at least a threshold time based upon the geolocation data. In further embodiments, identifying the user route may include determining a speed at which the user moves based upon the geolocation data, and identifying at least one of the transit route segments in the user route taken by the user based upon the speed at which the user moves. In still further embodiments, the transit route segments of the transit route data may include a plurality of road segments, and identifying the user route may include identifying at least one of the road segments as part of the user route taken by the user by comparing the geolocation data with locations associated with the plurality of road segments. In yet further embodiments, the method may include accessing user purchase history data indicating one or more electronic transactions of the user associated with transportation, and identifying the user route taken by the user may further include identifying the user route based in part upon the one or more electronic transactions. Accessing the user purchase history may include accessing purchase transactions associated with a transportation account or payment source linked to the user.

In some embodiments, the method may include determining a transportation risk associated with the user route taken by the user based at least in part upon risks associated with transit modes associated with the one or more transit route segments of the user route. Determining the transportation risk may further include accessing environmental data to determine environmental conditions associated with the user route during the corresponding times associated with a user trip.

In further embodiments, the method may include: storing user trip data associated with the user route associated with the user trip and associated with a plurality of additional user routes associated with additional user trips; generating a user transportation profile based upon the stored user trip data; and/or determining a user transportation risk associated with user trips of the user based upon the user transportation profile. The user transportation profile may include typical characteristics associated with user trips of the user, such as typical times, typical locations, or typical transportation modes. The method may further include accessing user profile data including information regarding assets of the user or insurance coverage levels associated with the user, as well as generating a multimodal transportation insurance policy for the user based upon the user transportation profile and the user profile data.

In yet another aspect, a computer-implemented method for generating a user-specific transportation assessment may be provided. The method may include: (1) receiving a user request to generate the user-specific transportation assessment; (2) accessing a user transportation profile including information regarding typical characteristics of user transportation associated with a plurality of user trips; (3) identifying a plurality of transportation scenarios based upon the user transportation profile; (4) determining a plurality of transportation risk levels corresponding to the plurality of transportation scenarios; (5) identifying a plurality of transportation usage alternatives based upon the user transportation profile and the plurality of transportation risk levels; (6) presenting a plurality of options associated with the plurality of transportation usage alternatives to the user; (7) receiving a user selection of one or more of the plurality of options associated with the plurality of transportation usage alternatives; (8) generating the user-specific transportation assessment based upon the user transportation profile, the plurality of risk levels, and/or the user selection; and/or (9) presenting the user-specific transportation assessment to the user. The method may include additional, less, or alternate functionality or actions, including those discussed elsewhere herein.

For instance, each transportation scenario may be associated with a transportation mode and a transportation environment. The transportation environment may include the following: a time of day associated with transportation and/or a geographic area associated with transportation. Additionally, or alternatively, the transportation environment may include an indication of one or more of the following: a weather condition associated with transportation, a duration of transportation, a distance of transportation, and/or a user physical condition associated with transportation.

In some embodiments, the method may further include collecting geolocation data regarding a plurality of locations of the user at a corresponding plurality of times using a geolocation unit of a mobile computing device associated with the user; and/or generating the user transportation profile based at least in part upon the geolocation data by determining a plurality of user routes taken by the user over a plurality of user trips. Such plurality of routes may be associated with a plurality of transportation modes.

In further embodiments, the user-specific transportation assessment may include a comparison of a baseline transportation profile and an alternative transportation profile. The baseline transportation profile may include one or more indications of aggregate risk associated with a transportation mode, while the alternative transportation profile may include one or more alterative indication of aggregate risk associated with the transportation mode. Such embodiments may further include generating the baseline transportation profile for the user based upon the user transportation profile and the plurality of transportation risk levels; and/or generating the alternative transportation profile for the user based upon the transportation usage alternatives and the plurality of transportation risk levels. The baseline transportation profile may be associated with a first geographic area associated with the plurality of user trips, while the alternative transportation profile may be associated with a second geographic area.

Additionally, or alternatively, the method may further include determining a total transportation risk for the user based upon the plurality of transportation risk levels and a plurality of weighting factors for the corresponding transportation scenarios. In such instances, identifying the plurality of transportation usage alternatives may include identifying a plurality of transportation usage recommendations. Such transportation usage recommendations may be associated with an increase or decrease in usage of at least one transportation mode to reduce the total transportation risk for the user. The plurality of options associated with the plurality of transportation usage alternatives may be associated with types of insurance coverage related to transportation, or levels of insurance coverage related to transportation. In further embodiments, generating and presenting the user-specific transportation assessment may include generating and presenting recommended insurance policy types and/or levels associated with (i) the typical characteristics of user transportation associated with the plurality of user trips indicated by the user transportation profile, and/or (ii) at least one of the plurality of transportation usage alternatives associated with the user selection.

Systems or computer-readable media storing instructions for implementing all or part of the methods described above may also be provided in some aspects. Systems for implementing such methods may include one or more of the following: a mobile computing device, an on-board computer of a vehicle, a station computing device at a transportation station; a remote server, one or more sensors, one or more communication modules configured to communicate wirelessly via radio links, radio frequency links, and/or wireless communication channels, and/or one or more program memories coupled to one or more processors of any such computing devices or servers. Such program memories may store instructions to cause the one or more processors to implement part or all of the method described above.

BRIEF DESCRIPTION OF DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with one or more possible embodiments thereof. Furthermore, wherever possible, the following description refers to the reference numerals included in the following figures, in which features depicted in multiple figures are designated with consistent reference numerals.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The systems and methods disclosed herein generally relate to, inter alia, collecting, communicating, evaluating, determining, and/or utilizing data associated with transportation modes or user transportation within a multimodal transportation network. Such systems and methods may include aspects of identifying available transportation options for users, which may then be used to schedule, purchase tickets, or coordinate utilization of such options. Identifying transportation options may include identifying routes for transportation, which routes may include multiple transportation modes. The systems and methods may similarly include collecting sensors data to monitor use of transportation modes by users, as well as the conditions under which such transportation modes are chosen by the users. The systems and methods may utilize such data to assess current transportation usage for specific user, as well as identifying and comparing alternative transportation options. These systems and methods improve user ability to utilize multimodal transportation networks.

Multimodal transportation networks discussed herein may include a plurality of types of transportation options, referred to herein as transportation modes. These transportation modes may include vehicles, public transportation systems, commercial transportation networks or platforms, TNCs, private transportation groups, or other transportation options or transportation-facilitation options. The various modes may include powered or manual vehicle usage (e.g., bicycling or skating), as well as traditional vehicle travel or travel via autonomous or automated vehicles. Vehicle travel may include travel in personal vehicle, shared vehicles, or public transportation vehicles (e.g., trains or buses). The transportation modes may likewise include walking. These and other advantages are further described below.

Exemplary Multimodal Transportation System

Figure 1:
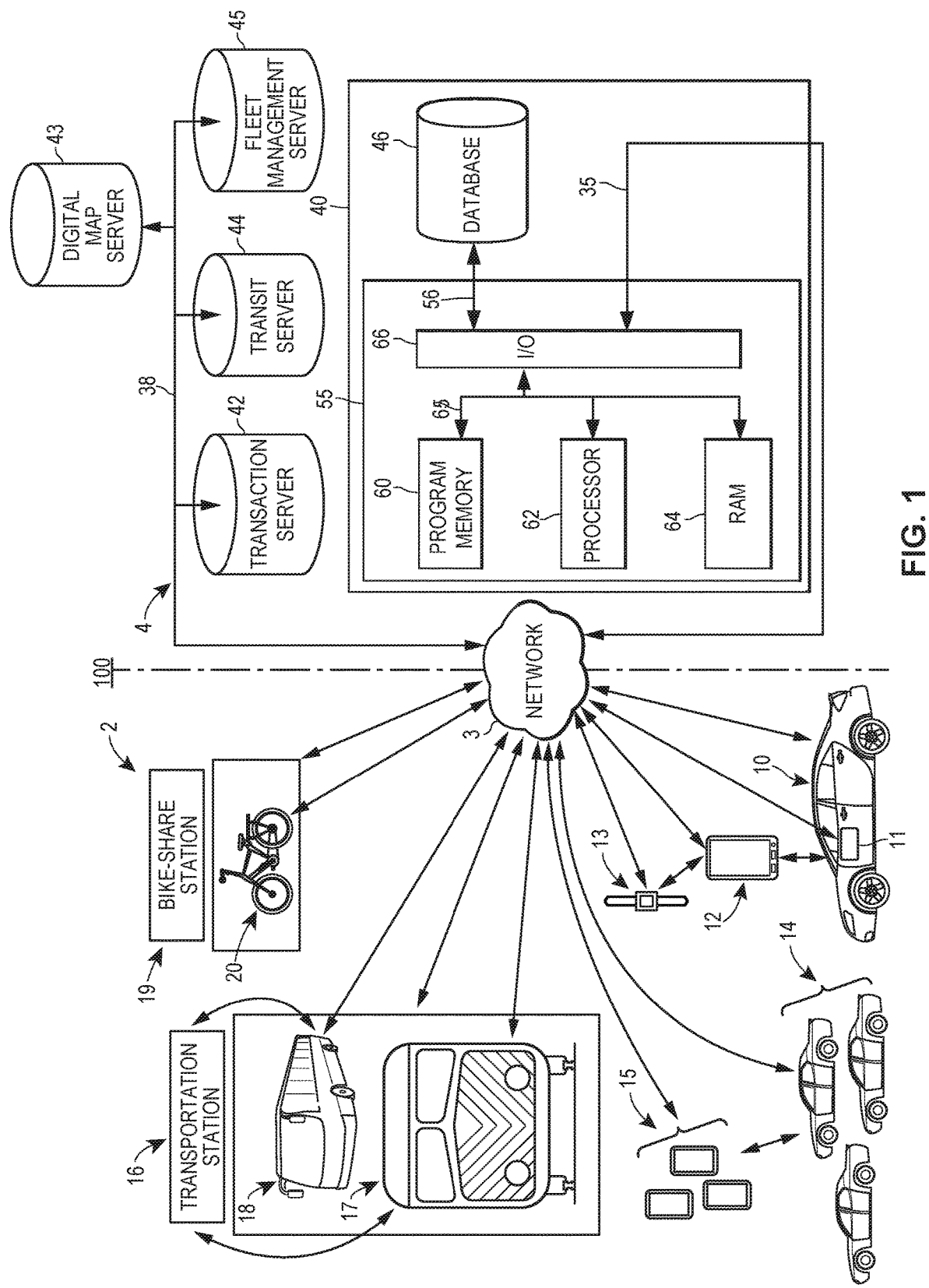
FIG. 1 illustrates a block diagram of an exemplary multimodal transportation data system for facilitating and/or monitoring transportation usage by a user.

FIG. 1 illustrates a block diagram of an exemplary multimodal transportation data system 100 on which the exemplary methods described herein may be implemented. The high-level architecture may include both hardware and software applications, as well as various data communications channels for communicating data between the various hardware and software components. The multimodal transportation data system 100 may be roughly divided into front-end components 2 and back-end components 4. The front-end components 2 may be configured to generate, obtain, process, or present data regarding transportation, including transportation data regarding various transportation modes or regarding user transportation. The back-end components 4 may be configured to obtain and process data associated with transportation for a plurality of users, which may include third-party servers associated with transportation data (e.g., map data servers or servers operated by transportation networks).

In some embodiments of the system 100, the front-end components 2 may communicate with the back-end components 4 via a network 3. Various mobile computing devices 110 (discussed in further detail below) may communicate with the back-end components 4 via the network 3 to allow the back-end components 4 to record information regarding transportation mode availability and usage. The back-end components 4 may use one or more servers 40 to receive data from the front-end components 2, store the received data, process the received data, and/or communicate information associated with the received or processed data.

The front-end components 2 may include various transportation components and computing devices configured to generate, process, or present information associated with the transportation components. The front-end components 2 may include one or more vehicles 10 having on-board computers 11, user mobile devices 12, wearable computing devices 13, and/or additional vehicles 14 associated with additional vehicle computing devices 15. The front-end components 2 may further include one or more transportation stations 16 associated with trains 17 or buses 18, bike-sharing stations 19, and/or bicycles 20. Each of the transportation components may be, may include, or may be associated with, a computing device, such as a mobile computing device 110 discussed below or other mobile devices, and each of the transportation components may be configured to communicate with any or all of the other transportation components (either automatically or with user instructions), as well as being configured to communicate with the back-end components 4 via communication links to the network 3. Such computing devices may generate or collect telematics or other data regarding user trips involving the various transportation components. Some embodiments may include fewer, additional, or alternative transportation components.

The vehicle 10 may be a personal vehicle associated with a user of the system 100, such as an owned or leased vehicle of the user. The vehicle 10 may similarly be a rental vehicle or a vehicle-share vehicle used by the user. In some embodiments, the vehicle 10 may be a vehicle in which the user is a passenger, such as a personal vehicle driven by another person, an autonomous vehicle, a taxicab, a rideshare vehicle driven by another person, or a TNC vehicle in which the user is a passenger. The vehicle may be any type of powered or unpowered vehicle used by the user for transportation. Over time, the user may make a plurality of trips between various locations using various vehicles 10.

Information regarding such trips may be generated, collected, transmitted, or stored by one or more mobile computing devices 110 associated with the vehicle 10 or the user, such as an on-board computer 11, a user mobile device 12, or a wearable computing device 13. The on-board computer 11 may be a factor-installed or aftermarket computer installed within the vehicle 10 to perform monitoring, control, or other functions. The on-board computer 11 may be configured to provide general vehicle management and control, or it may be configured for a specific purpose, such as monitoring vehicle usage or recording data regarding vehicle operation. The on-board computer 11 may interface with the one or more sensors within the vehicle 10 to collect data regarding vehicle movement or operation.

The user mobile device 12 may include general-purpose or special-purpose computing devices used by the user and designed for portability, such as a smart phone, a laptop computer, a notebook computer, a tablet computer, or other computing devices associated with the user. The user mobile device 12 may include one or more applications, programs, or routines configured to monitor user transportation, as well as generating an interface for presenting information to the user and receiving information from the user. The wearable computing device 13 may include general-purpose or special-purpose computing devices designed to be worn by the user, such as smart watches, smart glasses, fitness trackers, or other similar devices. The wearable computing device 13 may be configured to operate independently or may require a communication connection with a user mobile device 12 for some or all features. In some embodiments, additional sensors, transceivers, or computing devices in the operating environment of the vehicle 10 may collect or provide additional information. For example, infrastructure components may provide information regarding vehicle location or local conditions (e.g., weather or traffic conditions).

The front-end components 2 may further include one or more additional vehicle 14, which may be vehicles not associated with the user. Such additional vehicles 14 may include traditional, semi-autonomous, or autonomous vehicles not currently being used by the user, such as personal vehicles of others, commercial vehicles, or vehicle-share vehicles not being used by the user. Some such additional vehicles 14 may include or be associated with addition vehicle computing devices 15, which may be on-board computers or mobile devices similar to those discussed above. These additional vehicle computing devices 15 may be communicatively connected to sensors or other components within the additional vehicles 14, to other additional vehicles 14 or the vehicle 10, to infrastructure components, to other transportation components, or to the network 3. For example, the additional vehicle computing devices 15 may be configured to implement vehicle-to-vehicle or vehicle-to-infrastructure communication, which may include communication with the computing devices associated with the vehicle 10. The additional vehicles 14 and the additional vehicle computing devices 15 may be associated with other users of the system 100.

The front-end components 2 may further include public transportation components. The public transportation system components may include bus, train, ferry, ship, airline, and/or other public transportation system components. Such components may include vehicles, tracks, switches, access points (e.g., turnstiles, entry gates, ticket counters, etc., and/or payment locations (e.g., ticket windows, fare card vending machines, electronic payment devices operated by conductors or passengers, etc.). The public transportation system components may include one or more transportation stations 16 associated with trains 17, buses 18, or other public transportation vehicles. Such transportation stations 16 may include or be associated with one or more computing devices, which may facilitate payments or access to transportation, track scheduled or actual timing or locations of associated vehicles, collect information regarding transportation usage, or perform additional functions related to transportation.

These computing devices may communicate with the back-end components 4 via wired or wireless connections to the network 3. The various associated public transportation vehicles (including trains 17 or buses 18) may include mobile computing devices 110 to monitor status, location, or other information regarding such vehicles. Such information generated or collected by or for the public transportation vehicles may be communicated to the back-end components 4 from the vehicles' computing devices or may be communicated through computing devices at the transportation stations 16. For example, the transportation stations 16 may be communicatively connected to a transit server 44 to manage and record transit system operation associated with the station. The trains 17, buses 18, or other public transportation vehicles may follow scheduled routes, which may be fixed or variable and which may include limited stops at transportation stations 16 or other limited locations.

The front-end components 2 may further include vehicle-share stations, such as bike-share stations 19. Such vehicle-share stations may be disposed at fixed locations and may include dedicated structures or other physical components. For example, a bike-share station 19 may include a bicycle docking station configured to control access to a plurality of bicycles 20 by allowing users to retrieve bicycles 20 and return such bicycles 20 to the same or different bicycle docking stations. Alternatively, the vehicle-share stations may be virtual stations, such as dedicated parking spaces for vehicle-share vehicles or ad hoc locations wherever vehicle-share vehicles are parked (the locations of which may be maintained by a fleet management server 45). As with other vehicles in the system 100, the vehicle-share vehicles (e.g., the bicycles 20) may include associated computing devices, such as mobile computing device 110 removably or fixed installed within the vehicles. Such computing devices may monitor usage, movement, operation, location, or other data regarding vehicle usage or availability. For example, a bicycle 20 may include a GPS unit linked to a communication unit in order to provide real-time geolocation data indicating the location of the bicycle 20, from which geolocation data may be used to determine usage or availability of the bicycle 20.

The front-end components 2 may separately or collectively generate, collect, record, and/or transmit transportation data regarding transportation availability or usage. Such transportation data may include telematics data regarding location or movement of a vehicle or computing device, such as geolocation data (e.g., GPS coordinates), acceleration data, momentum data, other movement data, vehicle system data (e.g., configuration, option selection, or system status), vehicle operation data (e.g., application of brakes, tachometer readings, cornering, heading, headlight activation, or similar control-related data), user-associated data (e.g., heart rate from a wearable computing device 13), or other similar data regarding a transportation mode or the user.

The transportation data may further include data regarding a transportation environment, such as a geographic area, a time of day, a weather condition, a traffic condition, proximity of other persons or vehicles, or other similar information regarding an environment in which user transportation occurs. The transportation data may further include transportation-related data, such as transaction data (e.g., ticket purchase or usage), fleet data (e.g., vehicle availability for a plurality of vehicles), transit system status (e.g., schedule delays or alterations), or other similar data associated with transportation usage or with aspects of the multimodal transportation network.

In some embodiments, the front-end components 2 communicate with the back-end components 4 via the network 3. The network 3 may be a proprietary network, a secure public internet, a virtual private network or some other type of network, such as dedicated access lines, plain ordinary telephone lines, satellite links, cellular data networks, combinations of these. The network 3 may include one or more radio frequency communication links, such as wireless communication links with mobile computing devices 110, such as the on-board computer 11, user mobile device 12, wearable computing device 13, additional vehicle computing devices 15, or on-board computing devices of the trains 17, buses 18, or bicycles 20. The network 3 may also include other wired or wireless communication links with other mobile computing devices 110 or other computing devices, such as those associated with the transportation stations 16 or bike-share stations 19. Where the network 3 comprises the Internet, data communications may take place over the network 3 via an Internet communication protocol.

The back-end components 4 may include one or more servers 40 configured to implement part or all of the transportation management, monitoring, and assessment processes described herein. Each server 40 may include one or more computer processors adapted and configured to execute various software applications and components of the multimodal transportation data system 100, in addition to other software applications. The server 40 may further include a database 46, which may be adapted to store data related to transportation usage by a plurality of users. Such data may include user transportation profiles, as discussed elsewhere herein. Such data may similarly include, for example, dates and times of transportation use, duration of transportation use, types of transportation mode use, environmental conditions associated with transportation use (e.g., weather, traffic, road condition, time of day, day of week, etc., which may be uploaded to the server 40 via the network 3. The server 40 may access data stored in the database 46 when executing various functions and tasks associated with the methods discussed elsewhere herein.

The server 40 may have a controller 55 that is operatively connected to the database 46 via a link 56. It should be noted that, while not shown, additional databases may be linked to the controller 55 in a known manner. For example, separate databases may be used for various types of information, such as user transportation information, environmental conditions, insurance policy information, or other relevant information. Additional databases (not shown) may be communicatively connected to the server 40 via the network 3, such as databases maintained by third parties (e.g., weather, construction, or road network databases). The controller 55 may include a program memory 60, a processor 62 (which may be called a microcontroller or a microprocessor), a random-access memory (RAM) 64, and an input/output (I/O) circuit 66, all of which may be interconnected via an address/data bus 65.

It should be appreciated that although only one microprocessor 62 is shown, the controller 55 may include multiple microprocessors 62. Similarly, the memory of the controller 55 may include multiple RAMs 64 and multiple program memories 60. Although the I/O circuit 66 is shown as a single block, it should be appreciated that the I/O circuit 66 may include a number of different types of I/O circuits. The RAM 64 and program memories 60 may be implemented as semiconductor memories, magnetically readable memories, or optically readable memories, for example. The controller 55 may also be operatively connected to the network 3 via a link 35.

The server 40 may further include a number of software applications stored in a program memory 60. The various software applications on the server 40 may include one or more software applications for identifying and presenting available transportation options to a user, scheduling or otherwise accessing transportation modes, detecting user location and movement, determining user transportation mode usage based upon detected data, generating user transportation profiles based upon data regarding user transportation mode usage, and/or assessing user transportation usage or predicted usage. The various software applications may be executed on the same computer processor or on different computer processors.

The back-end components 4 may further include one or more additional servers providing information relating to transportation, associated with transportation modes, associated with users of transportation modes, or otherwise relevant to transportation usage monitoring or assessment. These additional servers may be configured to communicate with the server 40 via the network 3, and these additional servers may include a transaction server 42, a digital map server 43, a transit server 44, and/or a fleet management server 45. Information regarding availability or usage of transportation modes or vehicles may be stored in databases associated with the various additional servers 42-45, which data may be accessed as part of the methods described herein. In some embodiments, additional or alternative servers may be used to store information relevant to transportation modes or transportation usage, such as weather conditions or insurance policies.

The transaction server 42 may store data regarding user transactions associated with transportation. Such transactions may include purchasing or using tickets, registering or loading funds on an electronic fare card, creating an account with a vehicle-sharing or ridesharing service, creating an account with a TNC platform, incurring a transportation-related charge on a credit card or debit account, or other similar transactions associated with transportation usage. In some embodiments, the transaction server 42 may store information regarding transportation-related insurance policies or products associated with users, such as automobile insurance or trip interruption insurance. In still further embodiments, the transaction server 42 may store information regarding purchases or other transactions indirectly related to travel, such as luggage.

The digital map server 43 may store geocoded data regarding geographic areas through which users travel occurs. In some embodiments, the digital map server 43 may include route data for transportation modes (e.g., train tracks, bus routes, or route schedules). The route data may be identified with particular transportation modes and may further indicate locations of stations or stops along the routes. The digital map server 43 may also store path data, such as roadways or walking paths. Such route data or path data may be stored as a plurality of connected segments that indicate routes or paths, which may be compared with user locations to identify transportation usage by users. Terrain data and building data may also be stored by the digital map server 43, which may be used to identify apparent user movement that does not follow known streets or paths.

The transit database 44 may store data associated with public transit systems, such as train or bus lines. Such data may include scheduled or actual operation of vehicles within the system, which may further include records of locations of vehicles at various times during operation. The data may also include records of transportation system usage by users, such as system entry or exit locations and times. Such usage data may be associated with users based upon user accounts, in some embodiments, such as accounts linked to fare cards.

The fleet management server 45 may store data regarding fleets of vehicles, which vehicles may be commonly owned or may be variously owned. Such fleets of vehicles may include taxicab fleets, livery vehicle fleets, rental car fleets, commercial airline fleets, or similar fleets of vehicles used for passenger transportation. Such fleets may likewise include fleets of autonomous vehicles operating for passenger transportation. The fleets may further include vehicles registered with or owned by vehicle-sharing networks or platforms, such as bike-sharing networks or platforms allowing individual vehicle owners to enable access to their vehicles when not otherwise in use. The fleets may similarly include TNC fleets of drivers offering transportation services using their own vehicles.

Although the multimodal transportation data system 100 is shown to include one vehicle 10, one on-board computer 11, one user mobile device 12, one wearable computing device 13, a limited number of additional vehicles 14, a limited number of additional vehicle computing devices 15, one transportation station 16, one train 17, one bus 18, one bike-sharing station 19, one bicycle 20, one server 40, one transaction server 42, one digital map server 43, one transit server 44, and one fleet management server 45, it should be understood that different numbers of any or each of these components may be utilized in various embodiments. Furthermore, the database storage or processing performed by the one or more servers 40 and/or additional servers 42-45 may be distributed among a plurality of servers in an arrangement known as "cloud computing." This configuration may provide various advantages, such as enabling near real-time uploads and downloads of information as well as periodic uploads and downloads of information. This may in turn support a thin-client embodiment of mobile computing devices 110.

Exemplary Mobile Device

Figure 2:
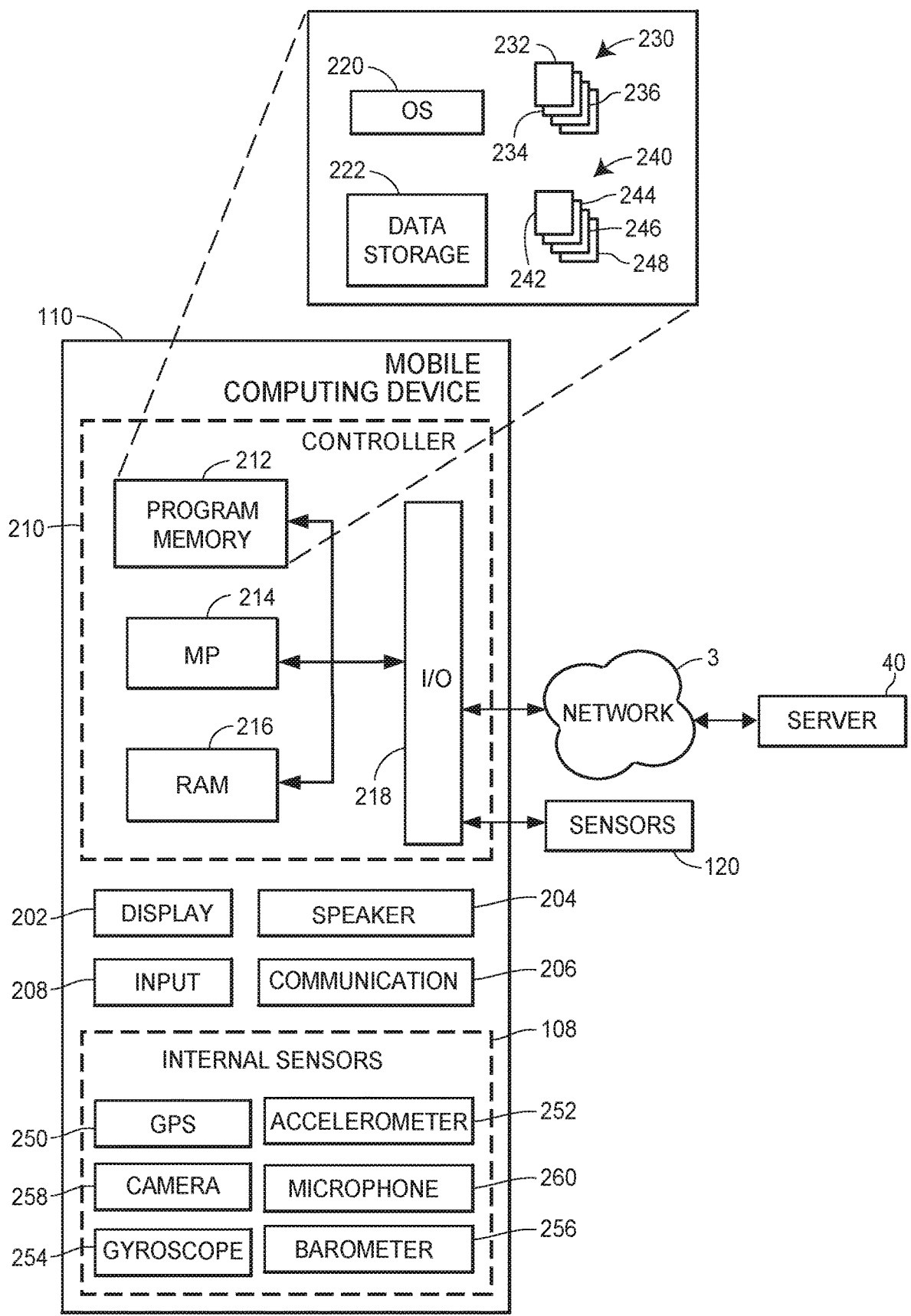
FIG. 2 illustrates a block diagram of an exemplary mobile computing device.

FIG. 2 illustrates a block diagram of an exemplary mobile computing device 110, consistent with the exemplary multimodal transportation data system 100. The exemplary mobile computing device 110 may be one of any of the computing devices associated with a user, vehicle, or transportation mode discussed above (e.g., an on-board computer 11 of a vehicle 10 associated with the user, a user mobile device 12 such as a cell phone associated with the user, a wearable computing device 13 such as a smart watch associated with the user, an additional vehicle computing device 15 associated with an additional vehicle 14, or a computing device associated with a transportation station 16, train 17, bus 18, bike-share station 19, or bicycle 20). The mobile computing device 110 may include a display 202, a speaker 204, a communication unit 206, an input 208, internal sensors 108, and a controller 210. The mobile computing device 110 may be communicatively connected to the server 40 via the network 3.

In some embodiments, the mobile computing device 110 and the server 40 may be integrated into a single device, or either may perform the functions of both. In further embodiments, the mobile computing device 110 may be communicatively connected to one or more external sensors 120, which may provide additional or alternative data to the data obtained from the internal sensors 108. Collectively, any set of one or more of the internal sensors 108 and/or external sensors 120 may be referred to herein as the "sensors."

Similar to the controller 55, the controller 210 may include a program memory 212, one or more microcontrollers or microprocessors (MP) 214, a RAM 216, and an I/O circuit 218, all of which are interconnected via an address/data bus. The program memory 212 may include an operating system 220, a data storage 222, a plurality of software applications 230, and/or a plurality of software routines 240. The operating system 220, for example, may include one of a plurality of general purpose or mobile platforms, such as the Android™, iOS®, or Windows® systems, developed by Google Inc., Apple Inc., and Microsoft Corporation, respectively. Alternatively, the operating system 220 may be a custom operating system designed for operation of special-purpose hardware, such as a wearable computing device 13 or an on-board computer 11 of a vehicle 10.

The data storage 222 may include data such as user profiles and preferences, application data for the plurality of applications 230, routine data for the plurality of routines 240, and other data related to the autonomous operation features. In some embodiments, the controller 210 may also include, or otherwise be communicatively connected to, other data storage mechanisms (e.g., one or more hard disk drives, optical storage drives, solid state storage devices, etc.), which may provide local or remote data storage (e.g., cloud storage).

As discussed with reference to the controller 55, it should be appreciated that although FIG. 2 depicts only one microprocessor 214, the controller 210 may include multiple microprocessors 214. Similarly, the memory of the controller 210 may include multiple RAMs 216 and multiple program memories 212. Although FIG. 2 depicts the I/O circuit 218 as a single block, the I/O circuit 218 may include a number of different types of I/O circuits. The controller 210 may implement the RAMs 216 and the program memories 212 as semiconductor memories, magnetically readable memories, or optically readable memories, for example.

The one or more microprocessors 214 may be adapted and configured to execute any of one or more of the plurality of software applications 230 or any one or more of the plurality of software routines 240 residing in the program memory 212, in addition to other software applications. One of the plurality of applications 230 may be a transportation management application 232 that may be implemented as a series of machine-readable instructions for performing the various tasks associated with identifying, scheduling, or purchasing access to available transportation modes.

Another of the plurality of applications 230 may be a transportation data application 234 that may be implemented as a series of machine-readable instructions for monitoring user travel during user trips to determine transportation modes utilized. Still another application of the plurality of applications 230 may include a transportation usage assessment application 236 that may be implemented as a series of machine-readable instructions for evaluating and comparing transportation options available to the user.

The plurality of software applications 230 may call various of the plurality of software routines 240 to perform functions relating to transportation usage monitoring, identification, or communication. One of the plurality of software routines 240 may be a clock routine 242 to maintain or determine a current time, which may be used to establish timestamps for user transportation data, as discussed elsewhere herein. Another of the plurality of software routines 240 may be a sensor control routine 244 to transmit instructions to internal sensors 108 or external sensors 120 and to receive data from such sensors. Still another of the plurality of software routines 240 may be a mapping routine 246 that accesses, analyzes, and displays map-related data from the digital map server 43. Similarly, one of the plurality of software routines 240 may be a monitoring and reporting routine 248 that transmits information regarding user movement to the server 40 via the network 3. Any of the plurality of software applications 230 may be designed to operate independently of the software applications 230 or in conjunction with the software applications 230.

The display 202 and speaker 204 of the mobile computing device 110, along with other integrated or communicatively connected output devices (not shown), may be used to present information to the user of the mobile computing device 110 or others. The display 202 may include any known or hereafter developed visual or tactile display technology, including LCD, OLED, AMOLED, projection displays, refreshable braille displays, haptic displays, or other types of displays. The one or more speakers 204 may similarly include any controllable audible output device or component, which may include a haptic component or device. In some embodiments, communicatively connected speakers 204 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The mobile computing device 110 may further include internal sensors 108. The internal sensors 108 may include any devices or components mentioned herein, other extant devices suitable for capturing data regarding a physical environment, or later-developed devices that may be configured to provide data regarding a physical environment (including components of vehicles, structures, or other objects within the physical environment). The internal sensors 108 of the mobile computing device 110 may be supplemented by additional sensors 120, in some embodiments, which may be physically and/or communicatively connected to the mobile computing device 110 to provide additional data to the mobile computing device 110. Some additional sensors 120 may be configured or intended for other uses, such as geolocation, movement tracking, photography, or spatial orientation of the device. Such additional sensors 120 may, nonetheless, be used to provide sensor data for transportation monitoring or usage, as discussed herein. As an example, the additional sensors 120 may include one or more additional accelerometers for detecting user movement during a user trip (i.e., accelerometers installed within a vehicle in which the user is traveling or a smart watch worn by the user).

Although discussion of all possible sensors of the mobile computing device 110 would be impractical, if not impossible, several sensors warrant particular discussion. Disposed within the mobile computing device 110, the internal sensors 108 may include a GPS unit 250, an accelerometer 252, a gyroscope 254, a barometer 256, a camera 258, or a microphone 260. Any or all of these sensors may be used to generate sensor data associated with user location or transportation usage. Additionally, other types of currently available or later-developed sensors may be included in some embodiments.

The GPS unit 250 and the accelerometer 252 may provide information regarding the location or movement of the mobile computing device 110. The GPS unit 250 may use "Assisted GPS" (A-GPS), satellite GPS, or any other suitable global positioning protocol (e.g., the GLONASS system operated by the Russian government) or system that locates the position of the mobile computing device 110. For example, A-GPS utilizes terrestrial cell phone towers or Wi-Fi hotspots (e.g., wireless router points) to more accurately and more quickly determine location of the mobile computing device 110, while satellite GPS generally is more useful in more remote regions that lack cell towers or Wi-Fi hotspots. The accelerometer 252 may include one or more accelerometers positioned to determine the force and direction of movements of the mobile computing device 110. In some embodiments, the accelerometer 252 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the mobile computing device 110 through three dimensional space can be established by combining the outputs of the X-axis, Y-axis, and Z-axis accelerometers using known methods.

Similarly, other components may provide additional positioning or movement sensor data. In some embodiments, a gyroscope 254 may be used in addition to, or instead of, the accelerometer 252 to determine movement of the mobile computing device 110. For example, a MEMS gyroscope may be included within the mobile computing device 110 to detect movement of the mobile computing device 110 in three dimensional space. Of course, it should be understood that other types of gyroscopes or other types of movement-detecting sensors may be used in various embodiments. Such sensor data may be used to determine relative movement of the mobile computing device 110 within a physical environment, such as during a trip. Such relative position information may be combined with other sensor data (such as GPS data) to determine movement of the mobile computing device 110 along a route. Such additional positioning or movement data may be used to differentiate user movement (e.g., within a vehicle) from movement of the mobile computing device 110 by the user (e.g., such as holding a phone to the user's ear during a phone call).

The camera 258 may be used to capture still or video images of the local physical environment of the mobile computing device 110. Such images may be used to identify user location based upon surroundings or to distinguish between movement of the user and movement of the mobile computing device 110 by the user. The one or more cameras 258 may include digital cameras or other similar devices, such as charge-coupled devices, to detect electromagnetic radiation in the visible wavelength range or other wavelengths. It will be readily understood that one or more cameras 258 may be disposed within the mobile computing device 110 and configured to generate either still images or video recordings. For example, multiple cameras 258 may be disposed to obtain stereoscopic images of the physical environment.

In some embodiments, the camera 258 may include an infrared illuminator or other device to stimulate emission within a targeted range. Such infrared illuminators may be automatically activated when light is insufficient for image capturing. Additional or alternative internal sensors 108 may be included in some embodiments to capture data regarding locations and shapes of objects within the physical environment.

The microphone 260 may similarly be used to detect sounds within the local physical environment, such as spoken notes or comments by the user of the mobile computing device 110. One or more microphones 260 may be disposed within the mobile computing device 110 or may be communicatively connected thereto. For example, wired or wireless microphones 260 may be communicatively connected to the mobile computing device 110, such as wireless speaker/microphone combination devices communicatively paired with the mobile computing device 110.

The mobile computing device 110 may also communicate with the server 40 or other components via the network 3. Such communication may involve the communication unit 206, which may manage communication between the controller 210 and external devices (e.g., network components of the network 3). The communication unit 206 may further transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc.

Additionally, or alternatively, the communication unit 206 may also be capable of communicating using a near field communication standard (e.g., ISO/IEC 18092, standards provided by the NFC Forum, etc.). For example, such near field communication may be used to activate or access a transportation mode (e.g., by using an electronic ticket or unlocking a vehicle door of a vehicle-sharing vehicle). Furthermore, the communication unit 206 may provide input signals to the controller 210 via the I/O circuit 218. The communication unit 206 may also transmit sensor data, device status information, control signals, or other output from the controller 210 to the server 40 or other devices via the network 3.

Exemplary Geographical Area

Figure 3:
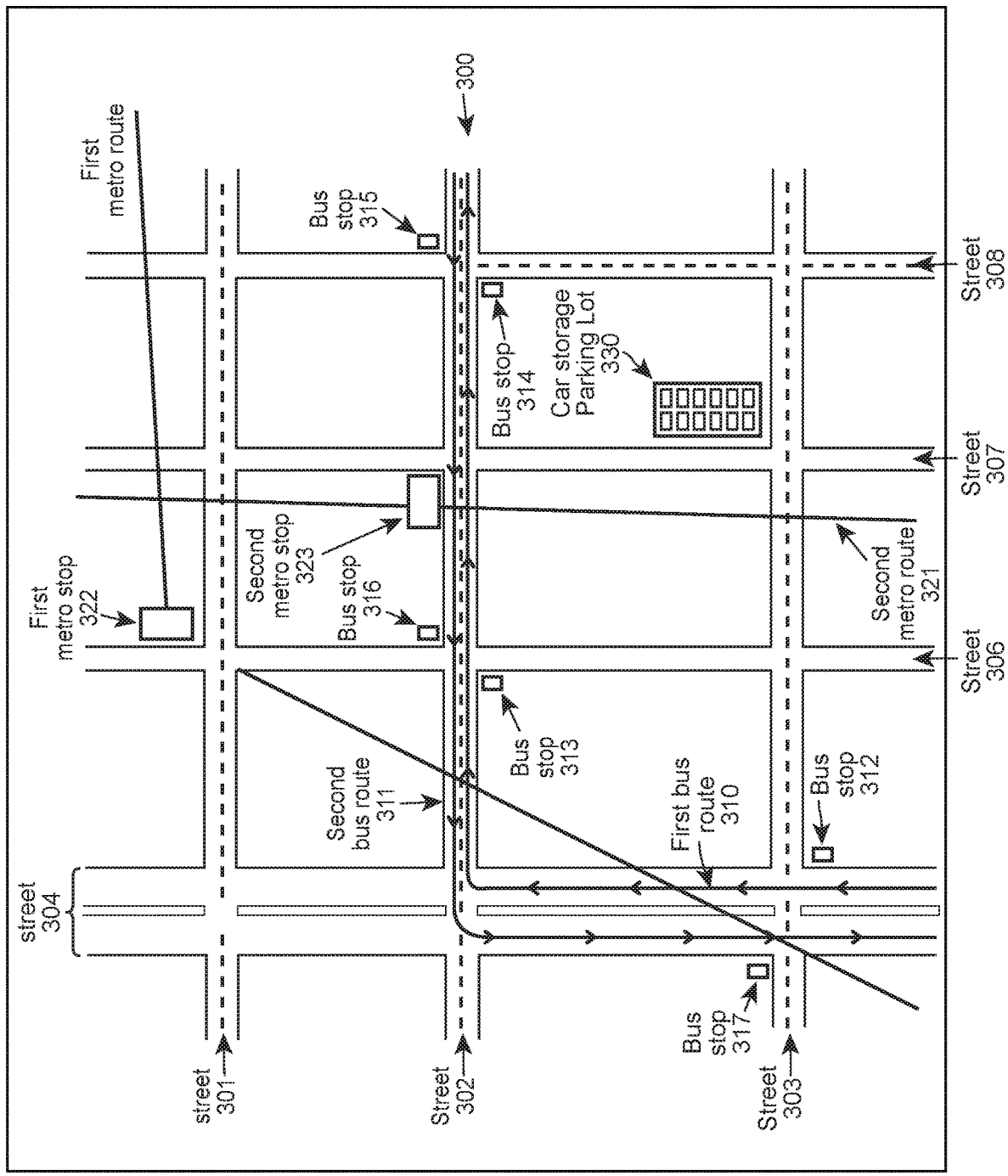
FIG. 3 illustrates a map of an exemplary geographic area and corresponding transportation modes.

FIG. 3 illustrates a map of an exemplary geographic area 300, showing locations corresponding to transportation modes of a local portion of a multimodal transportation network. The transportation modes may include both scheduled and on demand options, as well as personal vehicles available to the user. The scheduled options may include indications of the route or path (i.e., bus routes 310-311 and metro/train or subway lines 320-321) as well as stops or access points along the route (i.e., bus stops 312-317 and metro/train or subway stations 322-323). On demand options may include indications of pick-up, drop-off, or access points of the vehicle (i.e., rental car lot 330 and bike share station 340). On demand options may additionally include ride share options, such as taxi services or autonomous vehicles, that are available throughout the geographic area at the streets or roads 301-309. The streets or roads may also be used for walking, biking, or driving by personal vehicles.

Indications of the topology (including, for example, streets or roads, buildings, natural phenomena) may be stored in the digital map server 43. The map data may likewise include route segments associated with segments of potential transportation routes, such as discrete portions of streets, walkways, bus routes, rail routes, or similar pathways. Each such segment may be associated with geospatial locations indicating start and end points of the segment, and some segments may include additional path data indicating the path between the start and end points (e.g., a geospatial path between stations). Each segment may also be associated with additional information indicating at least a type of segment or modes of transportation associated with such segment (e.g., a walkway, a roadway, a rail line, etc.). Each such segment connects with at least one other segment at a start point or end point, although multiple segments may connect at junction points (e.g., roadway intersections or transportation stations).

Indications of available transportation modes (including, for example, access points, routes, and schedules) may be stored in the transit server 44. The exemplary geographic area 300 may be determined by some threshold distance around a selected location, which may be manually selected by the user or may be automatically selected by a server 40 or a mobile computing device 110 associated with the user. The selected location may be a user's current location, a user's future starting location for future travel, or a user's destination location. The selected location may also be a location between the user's current location and destination location, such as an end-point of a transit route along which the user is currently traveling. The selected location may be represented by GPS coordinates, which may be determined by the GPS sensor 250 of the mobile computing device 110 or selected by the user at the input 208 of the mobile computing device.

Exemplary User Movement Data

Figure 4:
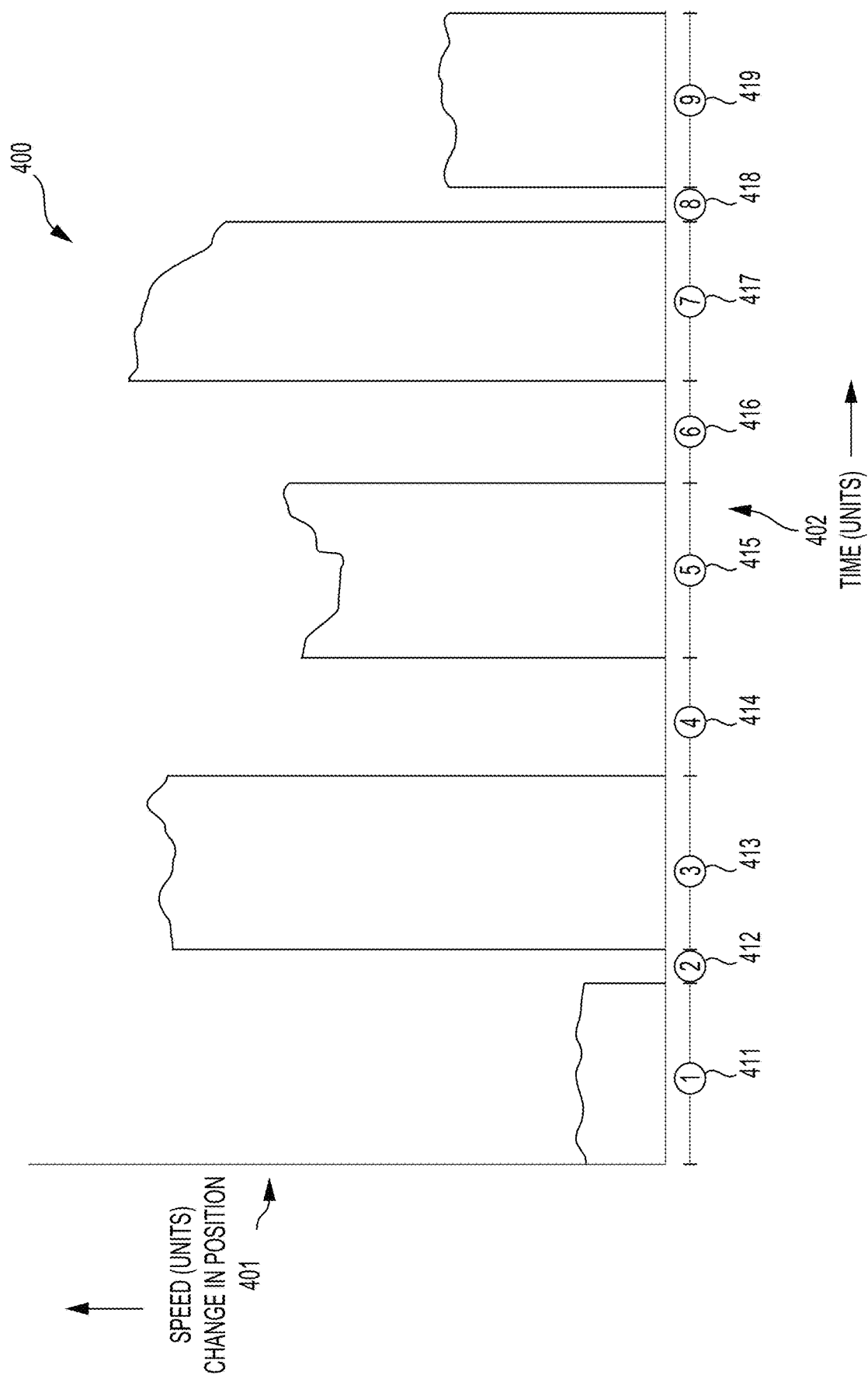
FIG. 4 illustrates a visual representation of exemplary user movement data.

FIG. 4 illustrates a visual representation of exemplary user movement data 400 collected using one or more mobile computing devices 110, such as a user mobile device 12. The user movement data may include indications of user location or movement during one or more user trips, such as when, where, at what speed, and how smoothly the user was moving. The location of user movement may be tracked by the GPS sensor 250 of the mobile computing device 110. The time of user movement may be tracked by the clock routine 242 of the mobile computing device 110. The smoothness of user movement may be tracked by the gyroscope 254 and accelerometer 252 of the mobile computing device 110. The speed of user movement may be determined by comparing time as recorded by the clock routine 242 with location as recorded by the GPS sensor 250.

In some embodiments, the GPS sensor 250 may track the location of the mobile computing device 110 at specified time intervals. The change in location over the time intervals may be calculated to represent the approximate speed of user movement. In some embodiments, the time intervals may be adjustable. For example, if the speed of user movement increases, the length of time intervals may decrease to maintain accuracy.

Portion 411 of the exemplary movement data 400 may represent a time period in which speed 401 of user movement is within a low-speed range consistent with the speed of walking, indicating that the user is walking. The speed fluctuations in portion 411 may indicate natural increases and decreases in speed consistent with a user's gait. Portion 412 may represent a period in which the user is not moving much or is stopped, such as while waiting at a transportation station 16. Portions 413, 415, and 417 may represent time periods in which the speed of user movement is consistent with the speed of multiple transportation modes including personal vehicle, ride share vehicle, rental vehicle, bus, or train/metro. Portions 414, 416, and 418 may represent time periods in which the user is again not moving or is stopped. Portion 419 may represent a time period in which the user speed is consistent with the speed of biking, indicating that the user is utilizing a bicycle 20 for transportation.

The transportation mode taken by the user at portions 413, 415, and 417 may be partially determined by the geographic location of the user as tracked by the GPS sensor 250 of the mobile computing device. For example, if the user location is not consistent with streets and roads as given by the digital map server 43, the transportation mode taken by the user may be identified as a train based upon such location data. In another embodiment, if the user location is consistent with streets and roads but the locations of the stops are not consistent with street or road intersections, the transportation mode taken by the user may be identified as a bus. In another embodiment, if the user location is consistent with streets and roads and the location of the stops are consistent only with street or road intersections, the transportation mode taken by the user may be identified as a personal, ride-share, or rental vehicle.

The transportation mode taken by the user at portions 413, 415, and 417 may be partially determined by how smoothly the user moves as tracked by the accelerometer 252 and gyroscope 254 of the mobile computing device 110. For example, if the acceleration and tilt of the user are consistent with the acceleration and tilt of a train, the transportation mode taken by the user may be identified as a train. In another embodiment, if the acceleration and tilt of the user are consistent with a large vehicle such as a bus, the transportation mode taken by the user may be identified as a bus. In another embodiment, if the acceleration and tilt of the user are consistent with the acceleration and tilt of a small vehicle such as a car, the transportation mode taken by the user may be identified as a personal, ride-share, or rental vehicle.

The transportation mode taken by the user at portions 413, 415, and 417 may be partially determined by the user transaction history as indicated by data stored in the transaction server 42. For example, if a user transaction is recorded consistent with a particular transportation mode (e.g., a train ticket purchase), the user may be determined to have taken that transportation mode (e.g., a corresponding train route). In some embodiments, the transportation mode taken by the user at portions 413, 415, and 417 may be partially determined by telematics data as recorded by a user's personal vehicle 10 or on board computer 11. For example, if the telematics data recorded by the on board computer 11 is consistent with the movement data collected at the mobile computing device 110, the transportation mode taken by the user may be identified as being the personal vehicle 10. The source of the movement data may likewise be used to identify part or all of the transportation modes used by the user over the course of a user trip. Where the data source is not determinative of the mode of transportation, however, analysis of telematics and/or location data may be used to identify user transportation mode usage, which may include comparison against known transportation mode locations, routes, and/or characteristics (e.g., speed, regularity, or stopping frequency).

Exemplary Transportation Option Identification & Usage

The methods and systems described herein may facilitate identification and selection of transportation options available to a user at specific times and locations. The variety of transportation modes in multimodal transportation systems may operate according to variable schedules or may otherwise have variable availability. In particular, vehicle-sharing and ridesharing options typically have highly variable availability that changes over the course of each day in a non-standard manner. As vehicles are used, the availability of such vehicle-sharing and ridesharing options in a local area is impacted. Thus, up-to-date data regarding transportation options that can account for such ongoing changes to transportation option availability enables a user to improve transportation usage selection, as well as enabling the user to utilize transportation options more efficiently.

Previous techniques do not include such ability to identify and use available multimodal transportation options in a multimodal transportation system. Instead, existing techniques either provide general routing recommendations or provide availability information for a specific type of transportation mode (e.g., only vehicle-sharing vehicle availability or only public transportation system routes). This may hinder users' ability to effectively identify route options utilizing multiple available modes of transportation.

The methods described below solve this problem of identifying transportation options in multimodal transportation systems by identifying and presenting transportation options based upon location, time, and current or relevant future availability of specific transportation modes. Additional considerations, such as user preferences, cost, or risk, may also be included in some embodiments.

Figure 5:
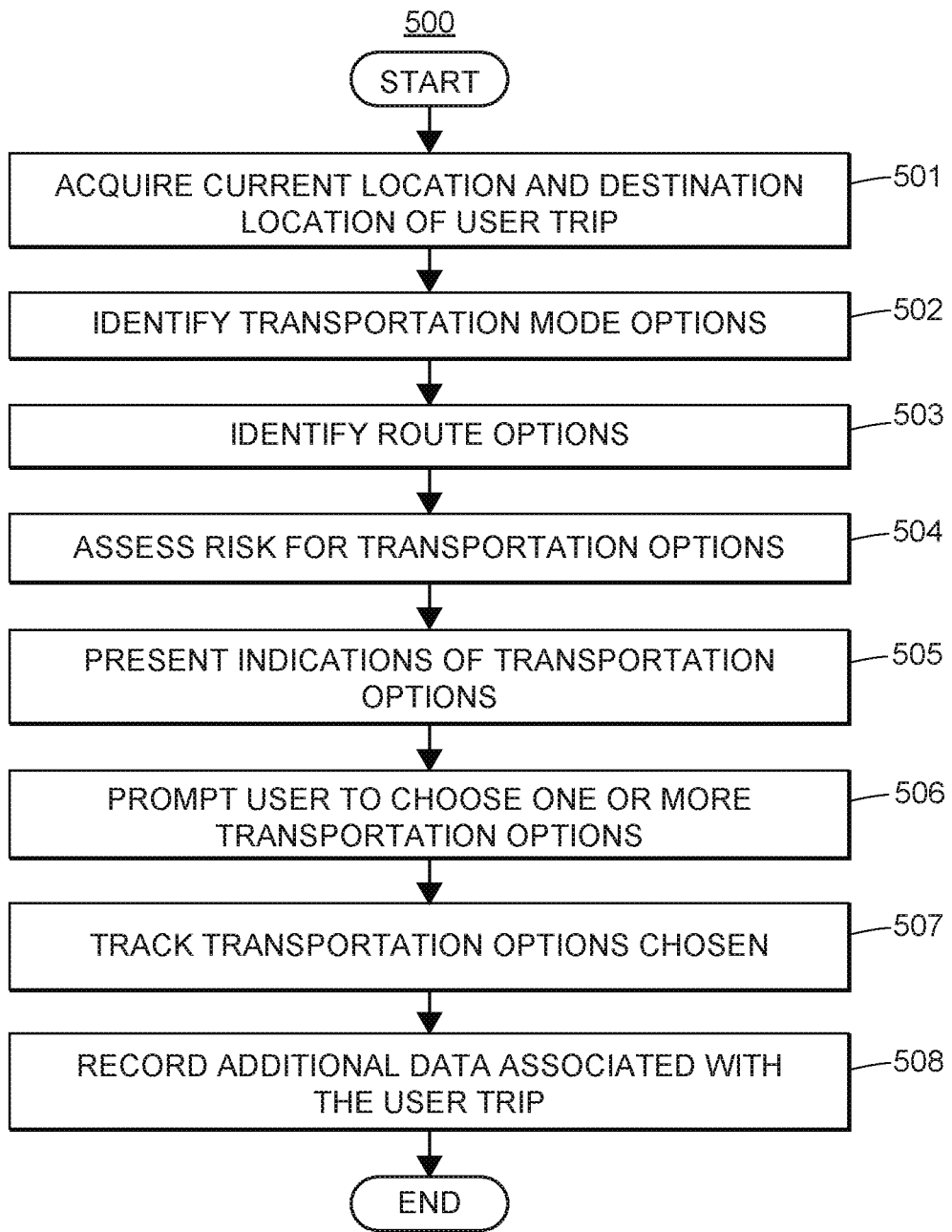
FIG. 5 illustrates a flow diagram of an exemplary user transportation option generation method.

FIG. 5 illustrates a flow diagram of an exemplary transportation option generation method 500 for identifying available options for transportation in a multimodal transportation network, such as the exemplary multimodal transportation networks discussed above. The computer-implemented method 500 may be performed by the server 40 and the mobile computing device 110 of a user to identify and present available transportation options within the multimodal transportation network. This may include communicating with third-party servers or other transportation network components, as described elsewhere herein, to determine transportation modes and the availability of transportation options associated with such transportation modes. In alternative embodiments, similar methods of identifying, presenting, or using available transportation options may be implemented, which may include additional, alternative, or fewer aspects to those described below.

The exemplary transportation option generation method 500 may begin with obtaining a user's current location and destination location of a trip (block 501). Transportation mode options (block 502) and, in some embodiments, route options (block 503) may be identified for travel between the current location and the destination location. Risk associated with the transportation options may be assessed (block 504), which may include transportation modes, combinations, and routes. Indications of the transportation options may be presented (block 505), which may include presentation of additional information such as risks associated with the options. In some embodiments, the user may be prompted to choose one or more transportation options (block 506). In further embodiments, the option chosen by the user may be tracked (block 507), and additional data associated with the trip may be recorded (block 508).

At block 501, the server 40 may receive or acquire a user-selected destination location for an upcoming trip. The server 40 may then acquire a starting location for the user trip, which may be the current location of the user obtained from the GPS sensor 250 of the mobile computing device 110. According to some embodiments, either or both of the starting location and the destination location may be a preset location (e.g., "home" or "work"), a GPS or other coordinate location, an attraction or destination (e.g., The Art Institute of Chicago or Homestyle Restaurant), or a street address.

At block 502, the server 40 may identify transportation mode options between the current location and the destination location. Identifying the transportation mode options may include first identifying a set of transportation modes in proximity (i.e., within a threshold distance) of one or more of the starting location (e.g., the user's current location), the destination location, or a waypoint along a route between the starting location and the destination location. Transportation modes may include any of the transportation modes discussed herein, such as public transportation (e.g., bus routes, metro, or train routes), personal vehicles, rental vehicles, on demand vehicles, ride share vehicles, autonomous vehicles, biking, or walking.

From the set of transportation modes in proximity to relevant locations, one or more transportation options may be identified. Transportation mode options may include indications of transportation mode type and transportation mode access point (e.g., the CTA Blue Line's Damen station or O'Hare station). Transportation mode options may be identified by proximity of transportation mode access points to the user current location or the destination location. Transportation modes may also be identified based upon transportation modes access points' proximity to locations between the current location and the destination location. Such transportation options may be identified based upon additional factors beyond proximity. In some embodiments, user preferences regarding transportation modes or characteristics (e.g., speed, cost, congestion, or frequency of delays) may be considered in identifying or ranking transportation options for the user.

In some embodiments, the availability of transportation modes may be used in identifying the transportation options. Thus, the server 40 may access transportation mode availability data from one or more databases or servers (e.g., third-party servers such as a transit server 44, and/or a fleet management server 45). Such transportation mode availability data may include information regarding availability of transportation options in the relevant areas and times associated with the user trip.

For example, the transportation mode availability data may include information regarding ridesharing options currently available through a third-party ridesharing platform in an area in proximity to a current user location. As another example, the transportation availability data may include information regarding the current or predicted relevant future availability of bicycles 20 in a bike-sharing station 19 or the availability of vehicle-sharing automobiles parked in proximity to the user's starting location.

In some embodiments, the transportation mode availability data may further indicate times when transportation mode options are expected to become available (e.g., arrival times or vehicle return times), times transportation mode options are expected to become unavailable (e.g., required vehicle return times or predicted vehicle usage by another user), or limitations on transportation mode usage (e.g., required vehicle drop-off points, limitations on duration of usage, or geographic area usage restrictions). In various embodiments, the transportation availability data may be used to identify the transportation options to present to the user, or to present availability information regarding transportation options to the user.

At block 503, in some embodiments, the server 40 may identify route options between the starting location and the user destination location. For example, multiple route options may be identified between a user current location and a user destination location. Route options may include one or more transportation options associated with a route between the starting location (e.g., the current location of the user) and the destination location. Route options may also include information regarding a comprehensive path between the current location and the destination location. Such routes may comprise a plurality of segments, with each segment being associated with transportation via a transportation option along a portion of the route.

For example, a route segment may correspond to train travel between two adjacent stations or air travel by a direct flight between two airports. In some embodiments, routes may be identified from map data stored in the digital map server 43, such as segment data associated with roadway segments stored in the digital map server 43. Because transportation modes may have overlapping paths, the routes may include overlapping route segments associated with different transportation modes (e.g., bicycling, driving, or utilizing a ridesharing service along the same portions of a roadway). Route options may also include specific instructions regarding a path from one transportation mode to a subsequent transportation mode, such as details to assist the user in following the route. Route options may have associated characteristics, such as time, cost, or distance associated with the route or with each transportation mode associated with a portion of the route.

At Block 504, the server 40 may determine risk levels associated with the identified transportation options, which may include transportation mode options and route options. To determine such risk levels, the server 40 may access risk-related data from the database 46 or other datastore, such as data associated with the frequency or severity of events associated with a transportation mode (e.g., vehicle accidents, pedestrian injuries, criminal activity, lost or stolen items, or other such events). The risk-related data may be associated with specific environmental conditions in which transportation is to occur, such as geographic area, weather conditions, traffic conditions, time of day, etc. Thus, the server 40 may acquire relevant current environmental data associated with the identified transportation options and determine the risk levels based at least in part upon such environmental data. Such risk-related data may be derived from data regarding prior events or losses to a plurality of other users.

For multimodal transportation options or route options, the transportation option risk levels may be determined by weighted combination of the risk-related data values associated with the transportation options, which may be weighted based upon duration, distance, significance, or other factors associated with the various transportation modes. The risk levels may be determined as quantitative or qualitative metrics (e.g., low risk, medium risk, or high risk), which may be based upon risk-related scores calculated for the transportation options. For each transportation option, the risks may be assessed based upon the transportation mode associated with such option. For a transportation route, the risks may be assessed for each individual transportation mode chosen and aggregated across the full trip.

In some embodiments, the risk levels may be determined to represent harm to a user or damage to a user's belongings. The risk levels may be assessed based upon current environmental factors, such as weather, time of day, day or year, and traffic. For example, driving a vehicle in heavy traffic may increase the determined risk levels. As another example, walking in cold or rainy weather may increase the determined risk levels. The risk may also be based upon a user profile or attributes specific to the user, which may further be based upon data regarding past user transportation usage. For example, a driver with a poor driving record may have high risk associated with transportation options in which that user is required to drive.

At block 505, the server 40 may cause indications of the identified transportation options to be presented to the user via a display 202 of the mobile computing device 110. This may include implementing a user interface on the mobile computing device 110 to generate and present the indications of the identified transportation options to the user, which may include transportation option indicators associated with information regarding transportation mode options or route options. The transportation option indicators may represent a set of the identified transportation options available for the user trip.

In some embodiments, the transportation option indicators may include information regarding the availability of the identified transportation options, such as estimated likelihood of availability, indications of limited availability, indications of sufficient availability, or estimated wait times or likely duration of continued availability. In further embodiments, the indications may further include risk indicators indicating the risk levels associated with each of the transportation options.

In some embodiments, the risk indicators may include indications of relative risk levels between the transportation options, routes, or portions thereof. Such relative risk level indications may include recommendations regarding the transportation options, such as recommended options or suggestions to avoid options. Such recommendations may be specific to the current environment associated with transportation, based upon acquired environmental data.

In further embodiments, the indications may include route indicators representing identified routes between the starting location and the destination location, as discussed elsewhere herein. The indications may further include additional information regarding the transportation options, such as the time or the cost associated with each of the options. In some embodiments, the indications may further include booking, purchase, or reservation information associated with the options, as discussed elsewhere herein.

At block 506, in some embodiments, the server may prompt the user to choose one or more of the indicated transportation options. This may include sending a message from the server 40 to the mobile computing device 110 to cause the mobile computing device 110 to present a prompt to the user via the display 202. Such prompt may include one or more recommendations regarding the presented transportation options, such as a recommended route or a suggested option (e.g., the shortest route, cheapest route, or lowest-risk route). Such prompt may likewise include information relevant to the user, such as risks or costs associated with a recommended transportation option.

The server 40 may prompt the user to choose any one of the available transportation options, which may include causing the user interface of the mobile computing device 110 to present transportation option selectors associated with the available transportation options. Such transportation option selectors may enable the user to indicate one or more transportation modes to be used. In some embodiments, further actions may be taken regarding the user-selected transportation options, as discussed elsewhere herein, which may include purchasing mode-specific or route-specific insurance coverage. The server 40 may prompt the user to choose a specific transportation option, or choose from a specific set of transportation options. The specific transportation option, or set of transportation options, may be selected based upon trip time, cost, risk, or other relevant factors.

In some embodiments, the user selection chosen by the user may be associated with a trip insurance option specific to one or more transportation options selected by the user. Such trip insurance option may include an option to purchase insurance coverage for user transportation according to selected transportation modes or routes, or such trip insurance may include acceptance of transportation insurance coverage under an existing policy (e.g., usage of a trip-based insurance credit or portion thereof). In some embodiments, the trip insurance may include a multimodal transportation insurance policy associated with a user trip including multiple transportation modes. In further embodiments, the trip insurance may include a route insurance policy covering a single trip by the user over a selected transportation route, which may further depend upon timing of the trip. Thus, the transportation options presented to the user may include one or more route insurance purchase options associated with such route insurance policies.

The trip insurance may be associated with a cost, which may be either fixed or variable. If variable, the cost may be determined based at least in part upon the risk levels associated with the user-selected transportation options. In some embodiments, aspects of such insurance coverage may be determined based in part upon additional information regarding the user, such as assets of the user or other insurance coverage held by the user. For example, an insurance policy limit may be determined based upon user assets because users with more assets to protect will need more coverage. Such additional information regarding the user may be obtained from a user profile stored in the database 46, which may include information regarding existing user policies, assets, purchases, or risk preferences.

In further embodiments, certain aspects of the insurance policy may be determined based upon information regarding the transportation modes or routes. For example, transportation options may be associated with different risk levels and expected severity of loss from such risks. As noted, these risk levels and associated severity levels may be further dependent upon environmental factors or conditions. In some embodiments, the user selection may cause the generation of a trip insurance policy based upon the details of the selection, the transportation options, and/or additional information regarding the user, which additional information may include information accessed from a user profile.

At block 507, the server 40 may optionally track the transportation option chosen or used by the user. Such tracking may include recording user selections or monitoring actual user travel, as discussed further elsewhere herein. Such tracking may be used for generating or updating a user transportation profile, determining risk levels or other information associated with transportation modes, determining insurance coverage or policy usage, or other purposes. The server 40 may additionally track the time, cost, and risk associated with the tracked transportation option. The tracked transportation option choice may be saved for access at a later point or shared with another user. The tracked transportation option choice may be saved, such that it can be easily accessed if the user wishes to take the same trip again in the future. In some embodiments, the user may be able to view a travel history based upon the tracked transportation option choices.

At block 508, the server 40 may record additional data associated with the trip. This data may include the environmental data, such as the weather, the time of day, day of year, transportation system status or delays, or traffic. The additional data may include the user's current location or an undisclosed destination location of the trip. The additional data may further include information regarding user transactions, such as purchases of tickets or use of transportation passes. Optional information, such as user ratings of transportation modes may also be included in some embodiments, such as ratings entered into a third-party service provider platform by the user associated with a ridesharing experience.

Figure 6:
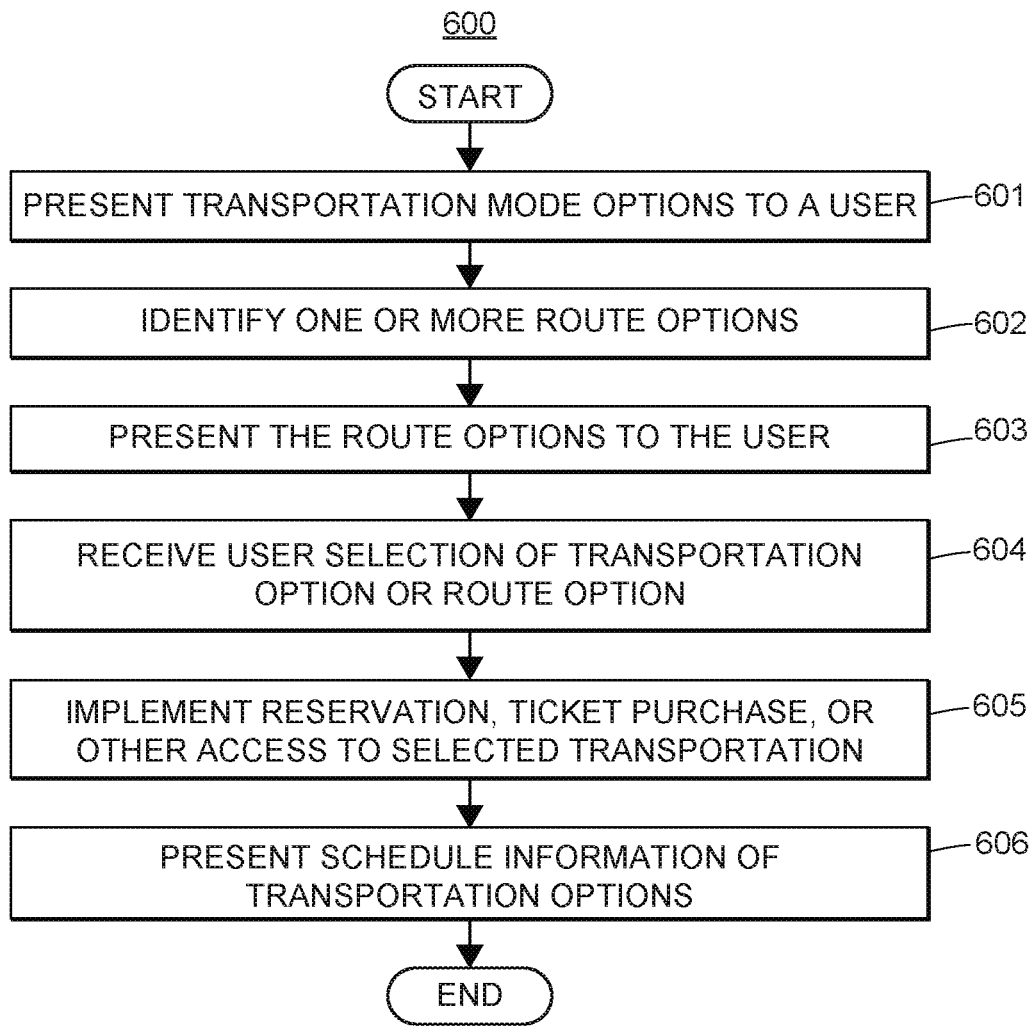
FIG. 6 illustrates a flow diagram of an exemplary user transportation option presentation method.

FIG. 6 illustrates a flow diagram of an exemplary transportation option presentation method 600. The computer-implemented method 600 may be performed by the server 40 to present transportation options to a user and implement access to transportation for the user. The transportation options may be presented at the display 202 of the mobile computing device 110. Once presented, the transportation options may be selected by the user to access additional information regarding a transportation option, to book, reserve, or purchase a transportation option, or for similar purposes.

The exemplary transportation option presentation method 600 may begin with presenting transportation mode options to a user (601), such as the transportation mode options determined according to the exemplary method 500. In some embodiments, route options may be identified (602) and presented to the user (603). A user selection of a transportation option may then be received (604), and reservation, ticket purchase, or other access to the selection may be implemented (605). In some embodiments, schedule information of transportation options may then be presented (606). In alternative embodiments, similar methods of generating user transportation profiles may be implemented, which may include additional, alternative, or fewer aspects to those described below.

At block 601, the display 202 of the mobile device 110 may present one or more transportation mode options to the user. Transportation mode options may include transportation modes that traverse any distance between a first location (e.g., a current location or other starting location) and a second location (e.g., a destination location). Such transportation mode options may traverse the entirety of the distance from the starting location to the destination location or may traverse only a portion thereof. Presentation of transportation mode options may include presentation of associated information, such as a risk associated with the transportation mode. In some embodiments, presentation of the transportation mode options may include transportation option selectors, which transportation option selectors may further include purchase options, reservation options, or other options for the user to obtain access to the transportation modes.

At block 602, in some embodiments, the server 40 may identify one or more route options. The route options may likewise traverse the full distance or a portion of the distance from the starting location to the destination location. The route options may be identified by combining one or more transportation mode options, such that a route is generated from a plurality of connecting route segments that are each associated with a transportation mode. For example, the full distance between the user's current location and the destination location may be covered by a combination of a plurality of transportation modes (e.g., walking, train, and bike-share bicycle), with each of the transportation modes being used to traverse one or more associated route segments.

At block 603, in some embodiments, the display 202 of the mobile computing device 110 may present one or more route options to the user. Presentation of route options may include presentation of additional information associated with the route options, such as a risk level associated with the transportation route. Risks associated with each of the route options may be determined by aggregating the risk level of each transportation mode that makes up the route, which risk levels may be weighted according to their relative significance to the route (e.g., duration or distance). The risk levels may be determined by reference to environmental conditions associated with travel, as well. Other information may be presented together with the route options, such as travel time, cost, distance, delays, etc. In some embodiments, presenting the one or more route options may include presenting one or more recommendations regarding the route options, such as a lowest-risk route, a lowest-cost route, a fastest route, or a best overall route.

At block 604, a user selection of one or more transportation options may be received from the user via the input 208 of the mobile computing device 110. Such selected transportation options may include route options. In some embodiments, selecting a transportation option may allow the user to access a second interface with further information about the transportation option. The user may select more than one transportation option, such as for comparison of multiple options before making a decision or for selection of multiple transportation options to produce a multimodal transportation route. The user may select a plurality of transportation mode options that traverse different sections of the user trip from the starting location to the destination location, such as transportation modes associated with different route segments.

In some embodiments, the user selection may include a selection of a transportation option selector associated with one or more transportation options or routes. Such transportation option selectors may include a purchase option indicators associated with purchasing a ticket, or otherwise facilitating a transaction, to enable the user to purchase access to an associated transportation option. Such transportation option selectors may likewise include reservation option indicators associated with reserving access to an associated transportation option, such as reserving a shared vehicle for a particular period of time (either beginning upon reservation or at some future time). Such purchase option indicators or reservation option indicators may be presented to the user along with options or information regarding details of options associated with the purchase or reservation (e.g., timing, payment, or similar options).

At block 605, the server 40 may implement the reservation, ticket purchase, or other access to one or more transportation modes associated with the selection by the user. In some embodiments, a second interface may facilitate the reservation, purchase, or other access to a selection, such as by scheduling access or communicating with a transportation system interface (e.g., an online ticket purchase web site). In some embodiments, the user may need to input purchase information, for example credit card or online payment account information. In other embodiments, the purchase processor may have payment information saved for a user or such payment information may be accessed from a user profile, such that the user can purchase a selection without inputting payment information.

In further embodiments, the system may be connected to different transportation systems such that any passes and tickets already owned by the user may be taken into account when purchasing a ticket. In some embodiments, a second interface may allow calling or booking use of a rideshare vehicle, taxi, or autonomous vehicle.

At block 606, in some embodiments, schedule information associated with the transportation options selected by the user may be presented to the user via the display 202 of the mobile computing device 110. For each relevant transportation mode option, relevant schedule information of the transportation mode may be displayed. For route options, the schedule information of each transportation mode that makes up the route may be displayed. In some embodiments, such schedule information may include information regarding times associated with estimated availability, such as when a train, bus, or rideshare vehicle is expected to arrive at a user access point.

Exemplary Transportation Mode Identification Methods

The methods and systems further described herein may facilitate identification of use of various transportation modes in a multimodal transportation network. Preexisting methods of collecting data regarding user travel have been limited to user surveys or collection of data regarding one mode of transportation (e.g., telematics data logs from a user-owned automobile). Because user entry of every use of every type of transportation would be burdensome and inaccurate, the methods disclosed herein are provided to solve the technological problem of automatically identifying transportation usage by a user. The methods described herein solve this problem by providing for the collection of data regarding multiple types of transportation usage, as well as distinguishing between different transportation usage types.

The computer-implemented methods may include automatic collection of user movement data via a mobile computing device 110 associated with the user (e.g., a user smartphone) to generate a user transportation dataset indicating user travel over a period of time. This user transportation dataset may then be analyzed to determine transportation mode usage based upon comparison of the collected data with characteristics of each transportation mode. In various embodiments, transportation routes, speeds, regularity, or stops may be used to determine transportation mode usage from the user transportation dataset.

Figure 7:
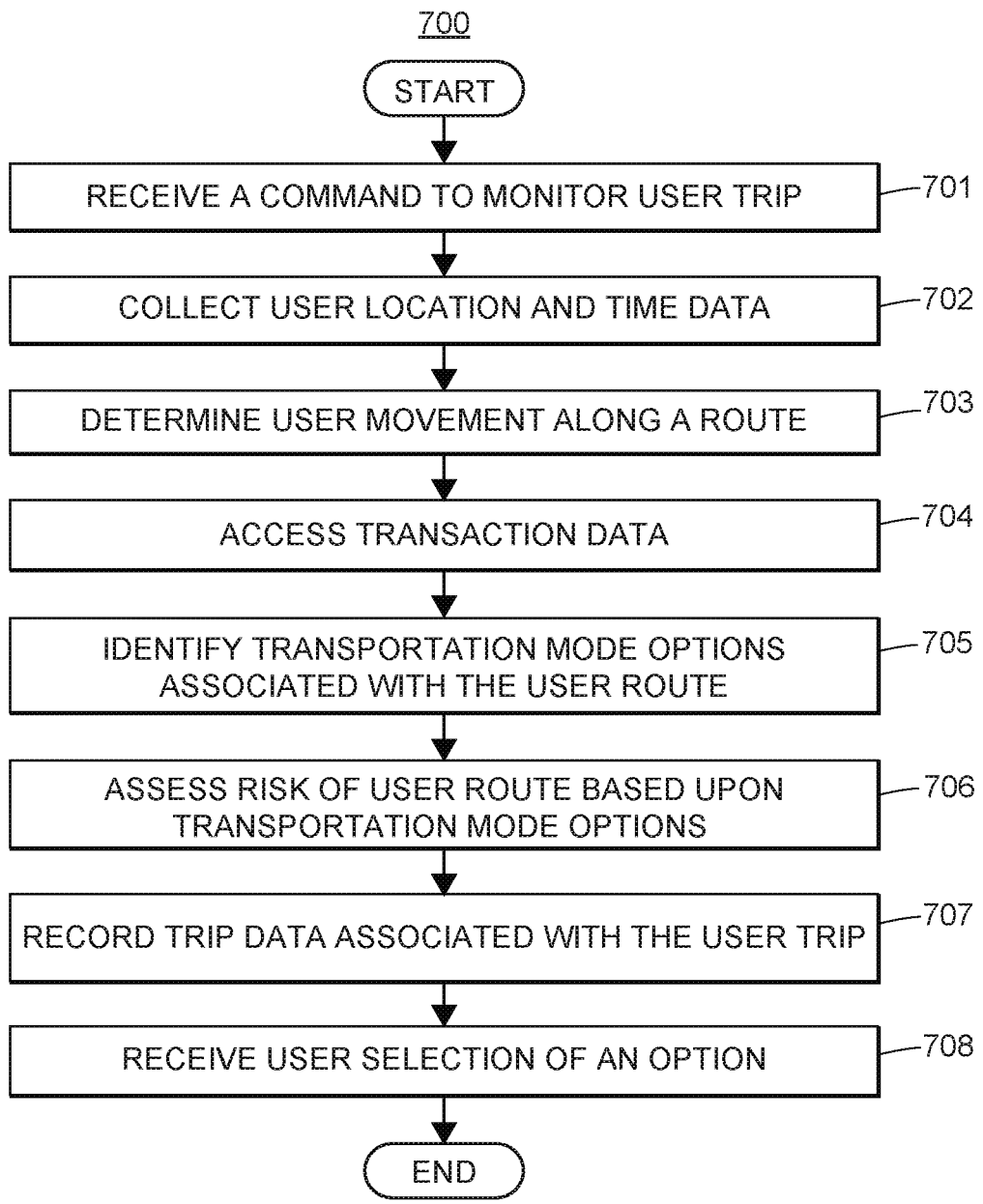
FIG. 7 illustrates a flow diagram of an exemplary user transportation mode identification method.

FIG. 7 illustrates a flow diagram of an exemplary transportation mode identification method. The method 700 may be performed by server 40 to identify transportation modes taken by a user either upon receipt of a specific request or periodically. The user transportation modes may be identified using telematics, transaction, transit system, fleet management, or other data stored in databases or third-party servers communicatively connected to the server 40. User movement data collected by the GPS sensor, accelerometer, gyroscope, and clock routine at the mobile computing device may also be used to identify the transportation mode. Once identified, the user transportation mode may be recorded to predict user transportation preferences, assess user transportation mode choices, or for similar purposes. In alternative embodiments, similar methods of identifying user transportation modes may be implemented, which may include additional, alternative, or fewer aspects to those described below.

The exemplary user transportation mode identification method 700 may begin with receiving a command to monitor a user trip (block 701), which user trip may involve a plurality of transportation modes. User location and time data may then be collected during the user trip (block 702), and user movement data along a course of the user trip may be determined (block 703). In some embodiments, user purchase history may be accessed (block 704), such as ticket purchase data. The user movement data and accessed user purchase history may be analyzed to identify one of more transportation modes associated with a user route taken during the user trip (block 705). Based upon transportation modes identified, in some embodiments, a risk associated with a user route may be assessed (block 706). In further embodiments, trip data associated with the user trip may be recorded (block 707), and an indication of the user trip may be stored in a user transportation profile (block 708). The user transportation profile may be stored or further analyzed, as discussed elsewhere herein.

At block 701, the mobile computing device 110 (e.g., a user mobile device 12) may receive a command to monitor a user trip. The command may be received from a user or may be issued by the mobile computing device 110 when the user indicates the user plans to embark on a trip. In some embodiments, the command may be issued automatically upon the occurrence of an event of the meeting of a condition frequently associated with user trips. For example, the command may be issued by the mobile computing device 110 when the user opens a query for directions regarding an upcoming trip. In some embodiments, the command may be issued by a server 40 when a vehicle associated with the user is used or when a transportation-related transaction is completed by the user, such as when a user schedules ridesharing or similar transportation. In further embodiments, the command may be generated when the user opens or uses an application running on the mobile computing device 110, such as an application associated with transportation or transportation-related insurance.

At block 702, the mobile computing device 110 may generate sensor data regarding a user trip. The sensor data may be generated and stored by the mobile computing device 110 automatically during the user trip, such as by an application running in the background of the mobile computing device 110 without any interaction required from the user. Such sensor data may include user location and time data, such as geolocation data from the GPS sensor 250 and time data from the clock routine 242. Such sensor data may additionally include acceleration data from an accelerometer 252, tilt data from a gyroscope 254, or other similar telematics data generated or derived from data generated by the sensors 108 or 120 of the mobile computing device 110.

The sensor data may be measured at fixed time intervals as recorded by the clock routine 242, or the time intervals may be variable. For example, the time intervals may vary based upon changes in movement of the mobile computing device 110, such as changes measured by the accelerometer 252 or the gyroscope 254. In another embodiment, the time intervals may vary based upon changes in the mobile device's speed as determined by changes in the location and time data as measured by the GPS sensor and clock routine. The sensor data may be sent from the mobile computing device 110 to the server 40 via the network 3 for further use, which may occur in real time during the user trip or following completion of the user trip.

At block 703, the server 40 may determine user movement data indicative of movement of the user along a route based upon the collected sensor data. The user movement data may include indications of when, where, at what speed, and how smoothly the user moved along the route. In some embodiments, the server 40 may first determine a route for the user trip based upon the geolocation data, which may further be used to determine an area of travel associated with the user trip. The server may determine user movement characteristics by matching changes in location data (such as measured by the GPS sensor 250) with the time as measured by the clock routine 242 to generate a timed route for the user trip, which may include a path taken, speed traveled along various segments of the path, stops along the path (and the duration of such stops), or other relevant movement data.

Such additional data may include acceleration, momentum, stability, or similar characteristics of the movement along each segment of the route. For example, the server may determine the speed at which the user moves by comparing location data collected from GPS sensor 250 to the time intervals at which it is collected, while determining how smoothly the user moves by analyzing acceleration data from the accelerometer 252 and tilt data from the gyroscope 254 of the mobile computing device 110.

At block 704, in some embodiments, the server 40 may access user purchase history from a transaction server 42. Purchase history may include information regarding user electronic transactions associated with use of a particular transportation mode, such as purchases of transportation tickets or passes made by a user using a credit card associated with the user, purchases made through an electronic wallet or other payment source associated with the user, purchases made using a transit account associated with the user (e.g., a public transportation card or account, a ride-sharing account, a rental car account), or similar transactions.

In some embodiments, similar data relating to use of pre-purchased transportation access credits may be accessed from a transit server 44. In further embodiments, similar data may be derived from user account creation or activity. For example, information regarding a user account log-in may be collected and used to determine a location, time, or type of transportation. In some embodiments, the user purchase history or similar additional transactional data may be used to determine an area of travel associated with the user trip.

At block 705, the server 40 may identify one or more transportation modes, or transportation options, associated with the user trip. The server 40 may identify the transportation modes by comparing the user movement data with characteristics of user movement data expected for each of a plurality of transportation modes. Such characteristics may include locations of transit route segments associated with transportation modes (e.g., roadways, bus routes, or train tracks), average speed of travel, speed range, acceleration in the direction of travel, acceleration or movement in a direction other than the direction of travel, variability in speed or acceleration, locations of stops, duration of stops, frequency of stops, or other similar characteristics of user movement.

For example, if the user movement data is consistent with a pace of walking, the server may identify walking as the user transportation mode. In another example, if the user location data indicates movement in a path not consistent with a roadway but with stops at locations associated with train stations, the server may identify a train as the user transportation mode. In still another example, if the acceleration and tilt data is consistent with a large vehicle traveling along a roadway, the server may identify a bus as the user transportation mode. In yet another example, if the acceleration and tilt data is consistent with a small vehicle not making frequent stops at locations other than intersections, the server may identify a personal, rental, or ride share vehicle as the transportation mode.

In some embodiments, the server 40 may use telematics data to identify one or more transportation modes associated with a user trip taken by a user by comparing data from multiple sources. For example, if the telematics data from a user's personal vehicle 10 or on board computer 11 matches the movement data associated with the user's mobile device 12, the server may identify the personal vehicle as the transportation mode used for at least a portion of the user trip.

In some embodiments, identifying the one or more transportation modes may include determining an area of travel associated with the user trip. Such area of travel may be identified based upon the location data associated with the trip, or the area may be identified based upon the transaction data obtained from a datastore. The area of travel may be used to identify a set of transportation options the user may have chosen, or to exclude transportation options not available in the area. For example, a bicycle sharing transportation mode may be excluded from the analysis for areas where such services are not available.

The area of travel may similarly be used to identify relevant digital map data or transit services to use in analyzing the user movement data to determine a user route. For example, the server 40 may access transit route data associated with the area of travel in order to identify transit routes used during the user trip. Such transit route data may include data regarding a plurality of transit route segments associated with one or more transportation modes operating in the area of travel.

In further embodiments, the server 40 may utilize information from a user purchase history or other user transactions to identify the one or more transportation modes. The server 40 may identify a transaction relating to a certain transportation mode in the user purchase history. For example, if a user's public transit account registered a transaction at a train station, the server may identify the train as the transportation mode associated with corresponding user movement data. The electronic transaction data (such as data regarding a purchase transaction) may be used to determine an area associated with the user trip, or a type of transportation mode associated with the user trip. Such transaction data may similarly be used to determine a specific transit route, which may be based upon a time or location associated with the transaction.

In some embodiments, the transaction data may be used to verify or confirm a transportation mode identified based upon user geolocation data, or the user geolocation data may be used to verify or confirm a transportation mode identified based upon the transaction data. In further embodiments, the transaction data may be used to determine additional data regarding the transportation mode used, such as details regarding a vehicle used in a vehicle-sharing transportation mode (e.g., a type, make, or model of a ridesharing automobile, installed safety features, or a driver of such vehicle).

In further embodiments, identifying the transportation modes may include identifying a user route taken by the user based upon the movement data, which user route may include information associating each of one or more portions of the route with a corresponding transportation mode. The route may include a plurality of connected route segments forming a representation of the path of the route, each of which is associated with a transportation mode. The user trip may include a one or more portions, each associated with a different transportation mode. For example, the user trip may include walking, train travel, and bicycling.

Each portion of the trip may further include one or more route segments. Such segments may be associated with travel along a defined portion of a route associated with a transportation mode, as discussed elsewhere herein. Some such routes or portions of routes may be identified from transit route segments based upon the user movement data, along with transaction data in some embodiments.

In some embodiments, identifying the transportation modes or options of the user trip may include identifying the user route based upon the user movement data and the transit route data, such as by matching user movements with transit route segments in the area of travel. In some such embodiments, the user route segments of at least a portion of the user route may be identified from the transit route segments based upon location and times of stops, which may further include information regarding the duration of such stops (e.g., stops meeting a minimum threshold duration).

In further such embodiments, the user route segments of at least a portion of the user route may be identified from the transit route segments based upon speeds associated with the transit route segments and speeds determined from the user movement data. In yet further embodiments, the user route segments of at least a portion of the user route may be identified from transit route segments indicating a plurality of road segments based upon comparing the user movement data with the locations of the road segments. In some embodiments, the user movement data may be obtained from, or verified by, telematics data received from a computing device associated with a vehicle, such as an on-board computer 11.

At block 706, in some embodiments, the server 40 may assess risk associated with the user trip based upon the transportation modes chosen. This may include determining one or more risk levels associated with the user trip, or a user route (or portions or segments thereof), as discussed elsewhere herein. In some embodiments, the risk levels may be determined based in part upon environmental conditions associated with travel. Thus, the server 40 may further access environmental data associated with the user trip, which may be obtained from a datastore, a third-party server, or the mobile computing device 110.

At block 707, in some embodiments, the server 40 may record trip data associated with a user trip. The trip data may include the transportation modes taken by the user, as well as information regarding the user route (e.g., a list of route segments). In some embodiments, the information regarding the user route may include times or durations associated with each of a plurality of locations or route segments. The trip data may include environmental data, such as time of day, weather, traffic, and day of year. The trip data may further include anomalies during the trip, such as delays or accidents.

At block 708, in some embodiments, the server 40 may store indications of the user transportation mode selections in a user profile. The user profile may be a user transportation profile, as discussed further elsewhere herein. The user profile may be generated or updated by the server 40 to reflect the transportation modes used by the user during the user trip. Information regarding the user route, route segments, environmental data, or additional data may be stored in the user profile.

In some embodiments, the user profile may store user trip data associated with a plurality of user trips. For example, user trip data associated with a plurality of previous user trips may be updated with user trip data associated with a current user trip. The user profile may include risk levels associated with various transportation modes under various environmental conditions. In some embodiments, the user profile may likewise include a general risk factor associated with the user based upon individual risk factors of past trips. In further embodiments, the user profile may include indicators of typical characteristics of a typical trip for the user, such as typical times, locations, or transportation modes used by the user.

In some embodiments, multiple sets of such typical characteristics may be indicated by the user profile, which may depend upon environmental conditions. For example, the user may utilize different modes of transportation during commuting, relative to transportation at other times.

The user profile may further note user preferences, for example public transportation, private vehicle, or walking. The user profile may likewise store additional user profile data associated with the user, rather than the user trip, such as information regarding user assets or insurance coverage, as discussed elsewhere herein. In further embodiments, the user profile data stored in the user profile may further be used by the server 40 to generate or update an insurance policy, such as a multimodal transportation insurance policy. Updating such a policy may include adjusting a typical user trip based upon additional information regarding user transportation or adjusting risks associated with user trips. In some embodiments, updating such a policy may include recording usage of the policy, such as by recording an account credit or debit associated with the policy upon recordation of usage of the policy to cover the user trip.

Exemplary User Interfaces

Figures 8A, 8B:
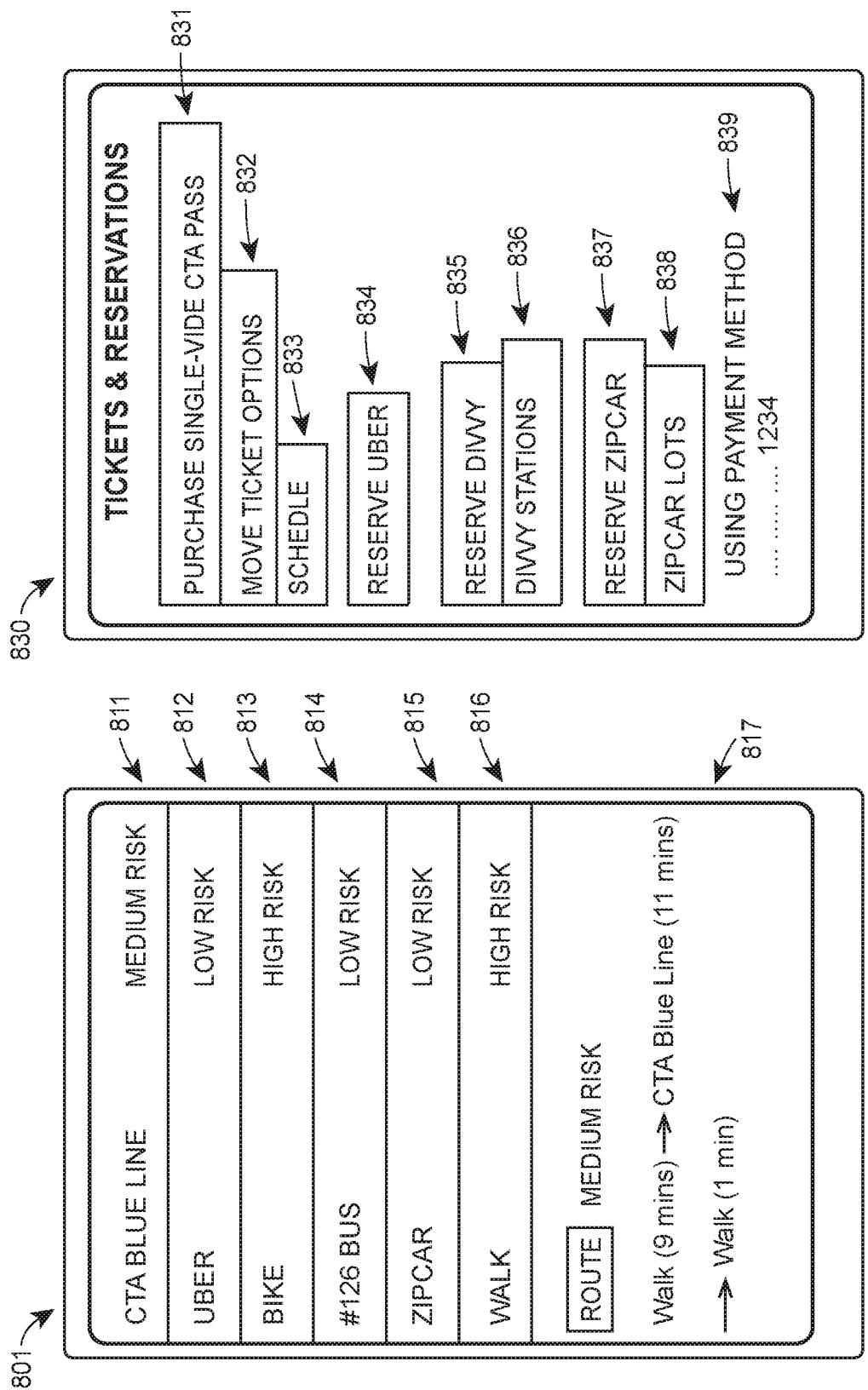
FIG. 8A illustrates an exemplary primary user interface for user transportation option presentation.
FIG. 8B illustrates an exemplary secondary user interface for user transportation option selection.
Figure 8C:
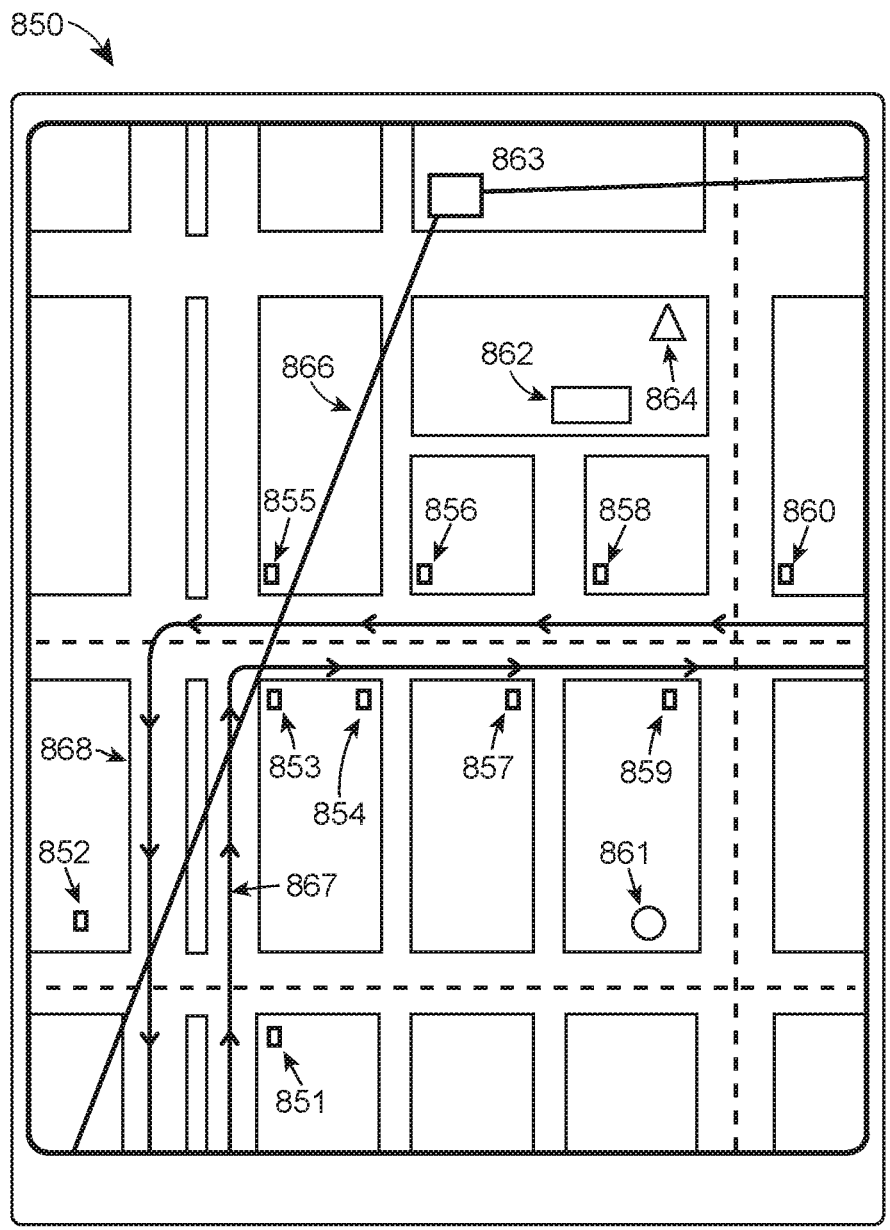
FIG. 8C illustrates an alternative secondary user interface for user transportation option presentation on a virtual map.

FIGS. 8A-C illustrate exemplary user interfaces associated with multimodal transportation system usage, including information presentation and options for accessing transportation modes. Each of the exemplary user interfaces may be presented to the user via a display 202 of a mobile computing device 110, such as a user mobile device 12. FIG. 8A illustrates an exemplary primary user interface 810 for user transportation option presentation. One or more of both transportation mode options 811-816 (presenting information regarding available transportation modes within the multimodal transportation network) and route options 817 (presenting information regarding one or more recommended routes) may be presented. As illustrated, the route option 817 may be denoted by a route label. Time of travel associated with a transportation route portion may also be indicated.

Each of the transportation mode options 811-816 displays information regarding associated transportation options (i.e., train travel, ridesharing, bicycling, bus travel, vehicle-sharing, and walking). In various embodiments, only available transportation options may be presented, or all transportation modes may be presented (with an indication of unavailable modes). A risk associated with each transportation mode option 811-816 or each route option 817 may also be indicated. The user interface may be interactive, such that the user can select an option to view information about any of the transportation mode options 811-816 or route option 817.

FIG. 8B illustrates an exemplary secondary user interface 830 for user transportation selection. The interface 830 may include purchase options 831 to purchase tickets for a chosen transportation mode or for a transportation mode that is part of a chosen route. Additional information options 832 (for presenting more information or more options regarding purchasing tickets or passes) or schedule presentation options 833 (for allowing the user to access locations and timetables for transportation modes) may also be presented. The interface may also include reservation options 835 and 837 to reserve vehicles for pick up at a certain place and time (e.g., bike-sharing or car-sharing reservations), as well as additional vehicle-sharing options 836 and 838 (for accessing information regarding other similar vehicle-sharing locations or services).

The interface may further include rideshare options 834 for calling a ride-share vehicle or an autonomous vehicle for pickup of the user at a current or specified location. The user interface may also enable the user to store any tickets or access accounts the user has associated with transportation mode options and use such tickets or accounts to purchase, or reserve, a spot. Thus, the user interface may include a payment or account selection option 839, which may present information regarding a current payment option, as well as allowing the user to select an alternative payment option. In some embodiments, this may include accessing user payment information, including credit card information or online wallet information, which may be used to purchase or reserve use of a transportation mode.

FIG. 8C illustrates an alternative secondary user interface 850 for user transportation option presentation on a virtual map. The secondary interface 850 may allow a user to view a map of the user's current location or other relevant location, in which access points for nearby transportation modes may be marked. Additionally, routes of the transportation modes with set paths may be marked. Streets may be shown and may be labeled. Additionally, a user location marker 864 may indicate the location of the user on the map. The different types of transportation modes may be marked by labels or icons that are differentiable from one another, for example icons of different shapes or colors. As illustrated, bus routes 867 and 868 may be shown over streets, with stop indicators 851-860 indicating locations of stops along the bus routes 867 or 868. A vehicle-sharing location 861 (e.g., a bicycle dock, car-sharing lot or parking space, or a current location of a vehicle-sharing vehicle) may be indicated on the map. Likewise, train stops 862 and 863 associated with train routes 865 and 866. Additional, fewer, or alternative indicators may be presented in various embodiments.

Exemplary Transportation Mode Assessment Methods

The methods and systems described herein may further facilitate evaluation and adjustment of transportation usage by users. Generally, user transportation profiles may be generated to indicate typical characteristics of transportation mode usage by users based upon information collected regarding user transportation mode usage, including telematics data or user transit purchase history data. Such transportation profiles may indicate typical characteristics of user transportation for various transportation scenarios, such as typical commuting routes or typical modes used during various weather conditions, times of day, etc. Unlike previous transportation systems, where user transportation options were limited by proximity to public transportation lines (e.g., train stations or bus stops) or required high initial investments (e.g., purchasing an automobile), modern multimodal transportation systems offer significantly more options and flexibility.

Because of the range of such transportation options available to users and the flexibility of user choice compared with previous transportation systems, however, users experience difficulty accurately tracking and assessing their transportation usage. Moreover, the complexity of such multimodal systems inhibits user comparison of alternative transportation options. Thus, users are unable to adequately assess and modify their transportation usage patterns to optimize their utilization of the variety of options now available. Existing tools for processing data either require extensive user input or lack user-specific detail, limiting their usefulness and accuracy. The user-specific transportation assessment methods described below solve these problems by automatically generating user transportation profiles with limited user input to facilitate automated analysis, comparison, and identification of recommendations for transportation usage.

Figure 9:
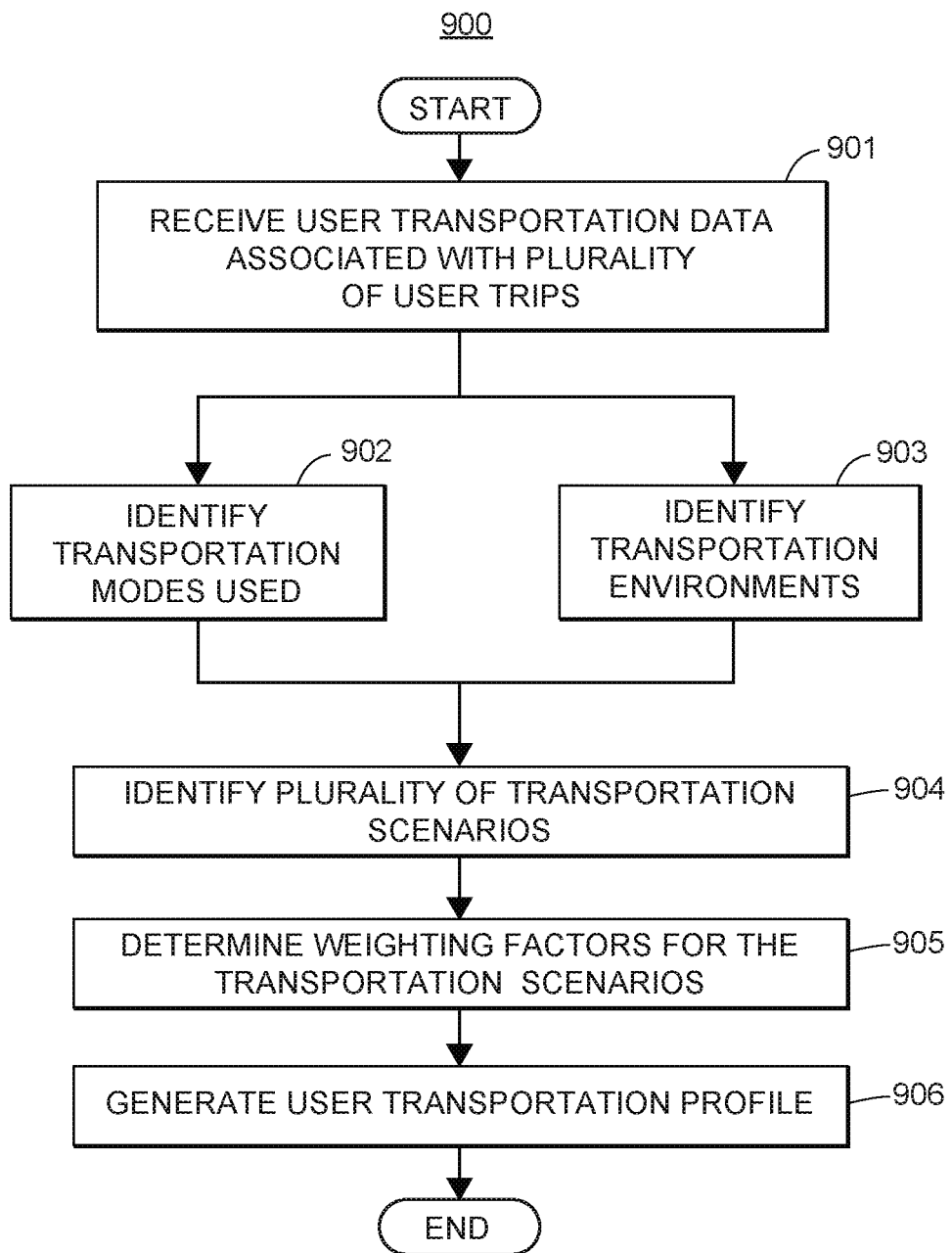
FIG. 9 illustrates a flow diagram of an exemplary user transportation profile generation method.

FIG. 9 illustrates a flow diagram of an exemplary user transportation profile generation method 900. The method 900 may be performed by the server 40 to generate a user transportation profile for a user, either upon receipt of a specific request or periodically. The user transportation profile may be generated using telematics, transaction, transit system, fleet management, or other data stored in databases or third-party servers communicatively connected to the server 40. In some embodiments, data entered by the user may also be used to generate the profile. Once generated, the user transportation profile may be used to assess and improve user transportation usage, to compare alternative transportation options, or for similar purposes. In alternative embodiments, similar methods of generating user transportation profiles may be implemented, which may include additional, alternative, or fewer aspects to those described below.

The exemplary user transportation profile generation method 900 may begin with receiving user transportation data associated with a plurality of user trips (block 901), which may involve a plurality of transportation modes, combinations, or routes. This user transportation data may then be processed to identify transportation modes used (block 902) and transportation environments within which transportation occurred (block 903). The transportation mode and transportation environment data may further be used to identify a plurality of transportation scenarios associated with the user transportation data (block 904), which transportation scenarios indicate combinations of modes and environments. Weighting factors for the transportation scenarios may then be determined based upon the prevalence and/or significance of the transportation scenarios (block 905). A user transportation profile indicating typical characteristics of user transportation may then be generated for the user based upon the weighting factors and the transportation scenarios (block 906). The user transportation profile may then be stored or further analyzed, as discussed elsewhere herein.

At block 901, the server 40 accesses or otherwise receives user transportation data associated with a plurality of user trips. The data may include telematics data automatically collected via a mobile computing device 110 associated with the user. Additionally or alternatively, the data may include data regarding user transportation option usage from any of the other sources described above (e.g., transaction data, transit data, or fleet management data).

Such data may include information regarding times, locations, transportation modes, routes, factors associated with travel, and/or other similar information regarding a plurality of trips. The plurality of trips may include various transportation modes and may be selected from a recent period (e.g., the past six months or year). In some embodiments, the plurality of user trips may include only trips taken by the user for whom the user transportation profile is being generated. In further embodiments, user trips taken by other users in the relevant geographic area may be used, either in addition to or in lieu of trips taken by the user for whom the user transportation profile is being generated.

Such data regarding user trips taken by other users may be useful in predicting user transportation choices in a new area (e.g., if a user is considering moving to another town or neighborhood). Such other user data may include user transportation data associated with other users who are similar to the user for whom the user transportation profile is being generated, such as users who have similar times of travel, similar destinations, or similar transportation usage in overlapping areas. For example, other users having similar commuting destinations and times may be selected as relevant for comparison.

In some embodiments, the data may further include entries made by the user, such as estimates of expected future transportation mode usage, which estimates may be made relative to current usage levels. Such estimates may be of particular value in generating a user transportation profile indicative of predicted future transportation usage by a user, such as for comparison. For example, the user may indicate that taxi or ridesharing usage may primarily replace driving if the user is considering selling an owned vehicle without replacement.

At blocks 902 and 903, the server 40 may identify transportation modes and transportation environments associated with the various user trips. The transportation modes identified at block 902 may be determined based upon movement, transaction, or similar data, as discussed elsewhere herein. In some embodiments, the user transportation data may indicate modes of transportation associated with the user trips or portions thereof.

In further embodiments, the user data may indicate routes taken during the user trips, or such routes may be identified as part of the transportation mode identification. In some such embodiments, the server 40 may receive geolocation data collected by one or more mobile computing devices 110 associated with the user, which geolocation data may indicate a plurality of times and locations during user trips. Such geolocation data may be processed as discussed elsewhere herein to identify user routes and modes of transportation for such user trips. Typical routes or typical modes of transportation may also be identified.

The transportation environments identified at block 903 may likewise be determined based upon the time and location information associated with the user trips. The transportation environments may include categorization of information relevant to transportation option choices, such as a time of day associated with transportation or a geographic area associated with transportation (both of which may indicate a purpose of transportation, such as commuting to or from work). Other factors may likewise be determined to be relevant, such as weather conditions (e.g., temperature, rain, or wind), duration or distance of transportation (e.g., whether the trip is a short trip to the store or a week-long vacation), or a user physical condition (e.g., user health condition). Such transportation environments may be used to determine purposes or general types of transportation for identification of transportation scenarios.

At block 904, the server 40 may identify a plurality of transportation scenarios combining transportation modes and transportation environments from the user transportation data. The transportation scenarios may be associated with typical conditions under which the user or users travel via certain transportation modes or combinations of transportation modes. The transportation scenarios may be associated with particular routes, particular combinations of origin and destination locations, particular combinations of locations and times, or combinations of locations and times indicative of purposes or types of travel. For example, the transportation scenarios may be determined to include a commuting scenario, a shopping scenario, an entertainment scenario during fair weather, an entertainment scenario during inclement weather, an entertainment scenario during holiday periods, etc., each of which may be associated with characteristic transportation mode usage patterns.

Although such purposes may be implicit in the transportation scenarios, some embodiments may not expressly identify such purposes or types of travel. For example, machine learning techniques (such as deep learning, combined learning, and/or reinforced learning techniques) may be used to identify transportation scenarios based upon the user transportation data, which may classify distinct types of user trips without expressly identifying the purposes of such trips. In some embodiments, external data sources may be used to obtain information relevant to the identification of transportation scenarios, such as business directories associated with geospatial coordinates, weather condition databases, user-specific or general calendars, or other similar data that may be connected to locations or times of user trips.

At block 905, the server 40 may determine weighting factors for the transportation scenarios. Such weighting factors may be calculated based upon the frequency of user trips under each of the relevant transportation scenarios, such as a percentage of all trips matching each scenario. In some embodiments, the transportation scenario weighting factors may be indicative of relative distance or duration of the transportation scenarios, giving greater weight to longer user trips.

In further embodiments, the significance of the user trips may be used in determining the weighting factors. For example, a scaling factor or transformation may be applied to reduce the influence of infrequent trips, or a threshold may be used to ignore infrequent user trips. Alternatively, the significance of the user trips may be determined based upon risk or cost of user trips, thereby increasing the weight of riskier or costlier user trips. Such weighting may be particularly beneficial in identifying alternatives or adjustments to improve user transportation option choices.

In embodiments in which the user transportation data includes data associated with other users, the significance of the transportation scenarios may be determined based at least in part upon the similarity between the other users and the user for whom the user transportation profile is being generated. Such similarity may further be determined based upon common destination locations, travel times, or transportation mode selection in geographic areas of overlapping travel between the user and the other users.

At block 906, the server 40 may generate the user transportation profile based upon the identified transportation scenarios and weighting factors. The user transportation profile may indicate the typical characteristics of user transportation option choices (e.g., use selections of various transportation modes or routes under various conditions) by information indicating the transportation modes typically used by the user under each of the various transportation scenarios. In some embodiments, information indicating typical routes or types of typical routes may be included in the user transportation profile. The relative importance of each transportation mode, combination of transportation modes, route, type of route, or transportation scenario may be indicated in the user transportation profile (e.g., by the weighting factors).

In some embodiments, risk levels associated with user transportation may be associated with the information in the user transportation profile, or information from which such risk levels may be determined may be included in the user transportation profile. When the user transportation profile is generated, it may be stored in the database 46 or may be used for further analysis and evaluation of user transportation usage, as discussed below.

Exemplary User-Specific Transportation Assessment Method

Figure 10:
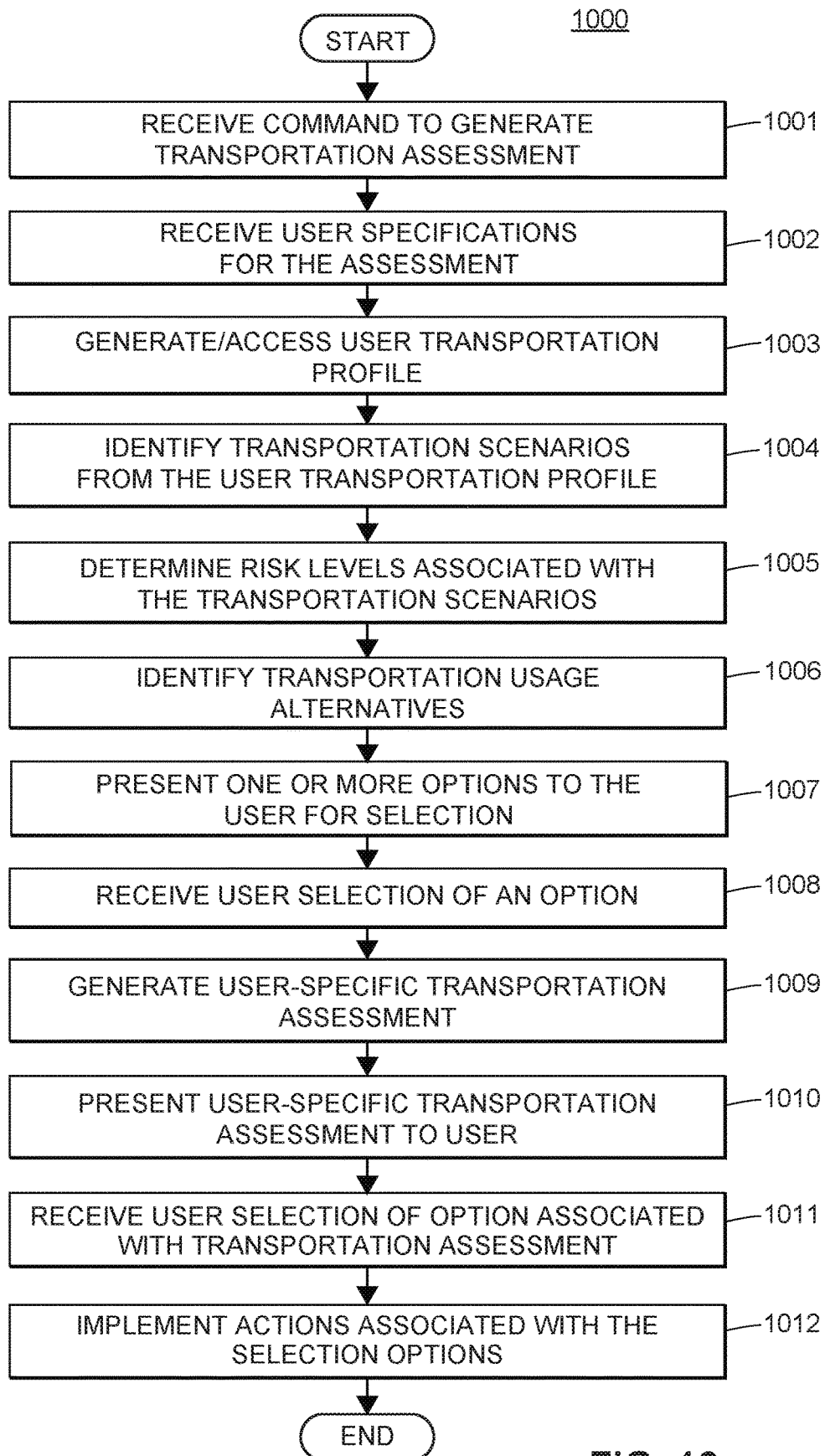
FIG. 10 illustrates a flow diagram of an exemplary user-specific transportation assessment method for generating a user-specific transportation assessment based upon one or more user transportation profiles.

FIG. 10 illustrates a flow diagram of an exemplary user-specific transportation assessment method 1000 for generating a user-specific transportation assessment based upon one or more user transportation profiles. The method 1000 may be implemented by the server 40 to assess current risks associated with current user transportation option choices, to identify or compare alternative transportation option choices, to recommend improvements to user transportation option usage, to compare risks associated with user transportation option choices across different geographic areas, or to identify or recommend insurance coverage options associated with the transportation option choices of the user. The user may interact with or direct parts of the exemplary method 1000 via a user interface of a mobile computing device 110, such as a user computer or smartphone.

By utilizing the specific user transportation profile associated with the user's past or predicted future transportation choices, the exemplary method 1000 may improve the accuracy, completeness, or ease of transportation usage analysis for the user, as well as saving substantial time by avoiding the need for detailed user entry of transportation choices over a suitable period of time. In alternative embodiments, similar methods of generating user transportation profiles may be implemented, which may include additional, alternative, or fewer aspects to those described below.

The exemplary user-specific transportation assessment method 1000 may begin with receiving a command to generate a transportation assessment for a user (block 1001). In some embodiments, user specifications for the assessment may also be received (block 1002), either together with the command or separately therefrom. Upon receiving such command, a user transportation profile may be generated or accessed for analysis (block 1003). The user transportation profile may be analyzed to identify transportation scenarios (block 1004), and associated risk levels may be determined for the transportation scenarios (block 1005).

In some embodiments, transportation usage alternatives may be identified based upon the user transportation profile (block 1006). In further embodiments, options may be presented to the user for selection (block 1007), and a user selection may be received (block 1008). Such options may be associated with transportation usage alternatives or comparison criteria. A user-specific transportation assessment may then be generated (block 1009). In some embodiments, the transportation assessment may be presented to the user for review (block 1010), which may include presenting options associated with the transportation assessment. In further embodiments, user selections of one or more such options associated with the transportation assessment may be received (block 1011), and actions associated with such user-selected options may be implemented (block 1012).

At block 1001, the server 40 may receive a command to generate the transportation assessment for the user. The command may be received from a user input into a mobile computing device 110, such as a user request at a user interface of an application running on the device, which may be a special-purpose application or a web browser application. Alternatively, the command may be automatically generated upon the occurrence of an event, such as the passage of time (e.g., for batch assessment generation campaigns) or upon the user accessing data or an application associated with transportation assessment (e.g., upon logging on to a web site or loading an application, such as those associated with an insurer). The command may include a user identifier or other information from which a user transportation profile may be accessed or generated for the user. In some embodiments, such information may be received separately from the user as a set of specifications for the assessment.

At block 1002, in some embodiments, the server 40 may receive additional user specifications for the assessment. Such additional user specifications may include a user identifier, may include information from which the user may be identified, or may include information from which related user transportation profiles may be generated or accessed.

In some embodiments, the additional user specification may include a set of user transportation-related data, which may include survey data regarding the user. For example, the survey data may include user home location, work location, typical commuting days or times, typical commuting modes of transportation, vehicles owned by the user, vehicle-share networks of which the user is a member, etc. Such survey data may be used to identify user transportation profiles for other users having similar characteristics as the user.

In some embodiments, the survey data may include one or more user estimates of types, times, or extent of various types of transportation mode usage by the user, which estimates may be combined with other data to identify relevant user transportation profiles for other users. In further embodiments, the additional data may include user location data, such as geolocation data from a GPS unit 250. In yet further embodiments, the additional user data may include an identifier of a user account relevant to transportation, such as a fitness tracker account, a transit system account, a rideshare user account, or similar accounts from which data regarding user travel may be obtained.

Additionally or alternatively, such additional user specifications for the assessment may include criteria for the assessment, such as locations or types of travel to assess. For example, a user may limit the assessment to include only commuting or to expressly exclude commuting transportation. Thus, the user may indicate certain transportation scenarios to either include or exclude from the analysis.

The user may similarly indicate particular changes or types of changes to the user's customary transportation choices to be assessed. Such changes may include using more or less of certain types of transportation options (e.g., increasing usage of environmentally friendly or healthy transportation options, such as bicycling or walking), eliminating certain transportation options (e.g., removing driving a user vehicle from the transportation options if the user is considering selling a vehicle), adding certain transportation options (e.g., adding driving a user vehicle to the transportation options if the user is considering purchasing a vehicle), or changing or comparing geographic areas or locations (e.g., such as comparing cities or neighborhoods if the user is considering moving to a new location or changing jobs).

In some embodiments, the user may indicate a comparison between current transportation usage in a first geographic area (e.g., a city or state) with predicted transportation usage for the specific user in a second geographic area (e.g., another city or state). In yet further embodiments, the additional user specifications may indicate one or more users to include in the comparison, such as other family members whose transportation changes may offset those of the user under certain conditions, such as when a family vehicle is added or removed. Such additional user criteria may be used to identify relevant transportation usage and perform relevant or combined transportation usage analysis.

At block 1003, the server 40 may obtain one or more relevant user transportation profiles for analysis. As discussed above, the user transportation profiles may include information regarding typical characteristics of user transportation usage, including various transportation scenarios associated with transportation modes and transportation environments. Although discussed below as one user transportation profile for clarity, it should be understood that multiple user transportation profiles may be generated or accessed to facilitate similar transportation analysis in other embodiments. For example, multiple profiles may be obtained to perform a comparison between current and predicted transportation mode usage by the user at different locations. The server 40 may attempt to identify an existing user transportation profile associated with the user that is stored in the database 46 based upon information identifying the user.

In some instances, the server 40 will need to generate the user transportation profile, as discussed elsewhere herein, using data accessed from a database 46 based upon the received user-identifying or user-descriptive data received by the server 40. In further embodiments, the server 40 may access additional data from third-party data servers to generate the user transportation profile, such as transaction servers or transit system servers.

At block 1004, the server 40 may identify a plurality of relevant transportation scenarios from the one or more user profiles. The transportation scenarios may be identified directly from data specifying the transportation scenarios stored in the user transportation profile, or the transportation profiles may be determined based upon characteristics of the data stored in the user transportation profile. All transportation scenarios indicated by the user transportation profile may be identified, or the transportation scenarios may be filtered to identify only those transportation scenarios meeting user specifications or criteria for the assessment. For example, if the user has indicated a desire to exclude commuting trips from the assessment, commuting-related transportation scenarios may be excluded from the set of transportation scenarios identified from the user transportation profile. As another example, only transportation scenarios associated with specified areas, types of areas (e.g., cities with commuter rail systems), or weather conditions (e.g., winter or precipitation) may be identified from the transportation scenarios included in the user transportation profile.

At block 1005, the server 40 may determine risk levels associated with the identified transportation scenarios. One or more risk levels associated with transportation may be identified for each transportation scenario of the identified transportation scenarios. Such risk levels may account for various facets of risk associated with transportation using various transportation modes in various transportation environments. For example, risk of vehicle accident may be significantly reduced when traveling by train, while risk of theft may increase relative to traveling via a user-driven vehicle. Alternatively, a total scenario risk level may be determined for each identified transportation scenario, which may combine (with appropriate weighting) various risks associated with the transportation scenario.

The risk levels associated with each transportation scenario may be determined by reference to historical data regarding accidents, theft, injury, property damage, criminal activity, or other relevant occurrences associated with transportation. The server 40 may obtain such historical data as aggregate risk levels stored in the database 46, which may be periodically updated based upon new data.

The risk levels may ultimately be derived in whole or part from loss data regarding claims for losses sustained by customers of an insurer, which may be combined in some embodiments with incidence reports from police, fire, or other public or private third-party data sources. For example, data regarding vehicle accidents may be obtained from a combination of automobile insurance claims and governmental statistical data regarding vehicle incidents (both of which may be mapped to locations and environmental conditions). In some embodiments, a total transportation risk level for the user may be determined based upon the one or more risk levels associated with the transportation scenarios in order to indicate a weighted risk across all relevant transportation modes and environments from the user transportation profile.

At block 1006, in some embodiments, the server 40 may identify one or more transportation usage alternatives. The transportation usage alternatives may include recommendations or information regarding changes to transportation choices of the user in some or all of the transportation scenarios. These alternatives may be identified based upon the risk levels determined for the identified transportation scenarios. This may include comparing the risk levels associated with the identified transportation scenarios against corresponding risk levels for alternative transportation modes under the same transportation environments to determine the differential between transportation modes in such conditions. It is important to compare transportation modes within the same or similar transportation environments because some environments increase risk generally across many transportation modes, such as snow or ice. The transportation usage alternatives may thus be identified by identifying one or more alternatives that have the potential to most reduce risk, or otherwise improve user transportation. In some embodiments, the alternatives may be selected based upon weighted risk, such as by using weighting factors indicative of frequency or significance of the transportation scenarios.

Thus, a lower reduction in risk associated with an alternative may be identified as more significant based upon an indication from the user transportation profile that corresponding transportation scenarios occur frequently or involve longer user trips. The transportation usage alternatives may include transportation usage recommendations for increasing or decreasing usage of one or more transportation modes in one or more transportation environments in order to reduce the total transportation risk for the user.

In addition to risk, other factors may be used to identify transportation alternatives, such as transportation mode availability at relevant places and times, transportation duration or distance, direct or indirect costs associated with transportation modes, or other factors affecting quality of the transportation experience of the user. For example, for approximately equivalent risk levels, cheaper or faster transportation options may be identified as alternatives for the user. In addition to, or as an alternative to, alternative modes of transportation, the transportation usage alternatives may indicate variation in timing of transportation, such as recommendations regarding traveling earlier or later in the day to improve transportation outcomes (e.g., reduce risk, reduce travel time, or reduce cost).

In some embodiments, the transportation usage alternatives may be determined at least in part based upon user specifications or criteria for the assessment. Such user specifications may include locations or transportation modes to particularly evaluate. For example, the transportation usage alternatives may be associated with criteria for a comparison against current user transportation choices, such that risk levels or other factors associated with transportation may see improvement or deterioration relative to current levels. In further embodiments, transportation alternatives may be determined based upon common transportation option choices made by other users having similar transportation usage characteristics, as indicated by the other users' transportation profiles.

At block 1007, in some embodiments, the server 40 may cause one or more options to be presented to the user based upon the analysis of the user transportation profile, which may include the identification of the transportation usage alternatives. Thus, the options may include a listing or other indication of the identified transportation usage alternatives for user selection, which may be provide to the user to enable the user to indicate whether the user would consider such alternative transportation modes, times, etc. For example, a user with a highly variable schedule may be uninterested in alternatives such as commuter rail transit that have rigid schedules with infrequent operation during some time periods. Alternatively, a user with a rigid schedule may be uninterested in alternative timing of transportation.

The presented options may be configured to facilitate identification of such user preferences for or against particular transportation modes. In further embodiments, the options may include recommendations of specific changes to transportation usage or recommendations of general types of changes to transportation usage. The options may similarly include verification or confirmation of user specifications or indications of changes associated with such specifications.

In further embodiments, the one or more options may include options associated with types or levels of insurance coverage related to the current or alternative transportation choices. Such insurance coverage may include mode-specific policies (e.g., automobile insurance or flight insurance), multimodal transportation insurance policies that cover multiple types of transportation (e.g., personal mobility policies), or holistic insurance policies that cover both transportation and non-transportation risks (e.g., umbrella policies). Options relating to such policies may be configured to facilitate user indication of interest in such policies or current coverage. Alternatively, similar options regarding insurance coverage may be presented together with or following presentation of the transportation assessment for the user. To present the options, the server 40 may send information indicating the options to a mobile computing device 110 for presentation to the user via display 202.

At block 1008, in some embodiments, the server 40 may receive one or more indications of user selections associated with the presented options. The user selections may be received from a mobile computing device 110 associated with the user based upon user input regarding the options. In some embodiments, lack of user input for a predetermined period of time may be interpreted as a user selection of none of the options. Any user selections received may be used in generating the user-specific transportation assessment by causing information regarding changes or recommendations to be presented or limiting such changes or recommendations.

At block 1009, the server 40 may generate the user-specific transportation assessment for the user. The transportation assessment may be generated based upon the information obtained from the user transportation profile, additional user specifications, the determined risk levels, identified transportation usage alternatives, and/or user selections of options. The transportation assessment may include summary or detailed information regarding current user transportation choices, predicted user transportation choices, user transportation choices under comparison criteria, various alternative transportation choices available to the user, or recommended transportation usage.

The assessment may present information regarding risk levels, costs, travel times, expected delays, health benefits, or other metrics associated with any of the current or alternative transportation usage patterns associated with the user. Such information may be formatted for direct comparison between current and alternative transportation usage in order to facilitate presentation and review by the user. The user-specific transportation assessment may include information from which the user may identify improvements to transportation usage, such as metrics regarding current and alternative usage.

In some embodiments, the transportation assessment may include recommendations regarding user transportation choices or recommendations related to user transportation. Such recommendations may include recommendations to use more or less of particular transportation modes (either generally or under particular conditions), recommendations to change timing or location of travel, or recommendations regarding transportation-related services. Transportation-related services may include ridesharing services, vehicle-sharing networks, or insurance products covering transportation-related risks.

In some embodiments, the user-specific transportation assessment may include a comparison of a baseline transportation profile for the user and an alternative transportation profile for the user. The baseline transportation profile may be the user transportation profile generated from observed user transportation choices, representing actual transportation scenarios chosen by the user during previous user trips. The alternative transportation profile may be a prediction of user transportation choices of the user based upon specified criteria or changes to transportation usage. The alternative transportation profile may be generated based upon the identified transportation usage alternatives in order to indicate the likely user response to certain changes in the user's transportation usage.

In some embodiments, the baseline transportation profile may be associated with a first geographic area where most of the current user trips occur, while the alternative transportation profile may be associated with a second geographic area where the user does not frequently travel. For example, the user may be considering moving to another town, or to another neighborhood within the same town, which may cause numerous changes to the transportation modes used by the user. Moving to another town or another location nearer or further from a train station may cause the user to adjust not only train transportation but also driving or ridesharing transportation. Similarly, the base profile may indicate a combination of user transportation profiles for a set of users (such as a family), while the alternative transportation profile may indicate a combination of predicted changes for each of the users in response to certain changes in transportation criteria.

In further embodiments, more than one alternative transportation profile may be generated or assessed for comparison, thereby facilitating direct comparison of risks or other factors between multiple changes to user transportation choices. Both the baseline transportation and the alternative transportation profile may be assessed to determine risks for the user, as well as other transportation-related factors such as cost, time, or available or recommended insurance coverage.

At block 1010, in some embodiments, the server 40 may cause the generated transportation assessment to be presented to the user. To present the transportation assessment, the server 40 may send information associated with the assessment to a mobile computing device 110 for presentation to the user via display 202. Such presentation may be made via the user interface operating on the mobile computing device 110. In some embodiments, this may include providing a web page containing the transportation assessment to the mobile computing device 110.

Presenting the transportation assessment may include presenting recommendations to the user associated with transportation usage. In some embodiments, presenting the recommendations may include generating and presenting recommended insurance policy types or levels of coverage associated with user transportation, such as multimodal transportation insurance policies. Such policies may be associated with typical characteristics of user transportation based upon the user transportation profile or may be associated with one or more transportation usage alternatives to current user transportation choices.

In further embodiments, one or more options may be presented to the user along with the information or recommendations of the transportation assessment. Such options may include options to make further changes, add or remove user specifications, or otherwise perform further analysis or comparison. Such options may likewise include options to obtain additional information from which the user may take further actions, such as information regarding ridesharing platforms or networks, public transportation schedules, purchasing or selling a vehicle, or available insurance products.

In some embodiments, the options may include options to take actions to implement recommendations regarding transportation usage or transportation-related services. Such options may include options to create an account with a ridesharing or vehicle-sharing service, order public transportation system tickets or passes, contact a local vehicle dealership, or obtaining a transportation-related insurance policy.

At block 1011, in some embodiments, the server 40 may receive one or more user selections of the one or more options associated with the transportation assessment. Receiving such user selections may include receiving additional information associated with the selections, such as user contact or financial information. Upon receiving such user selections, at block 1012, in some embodiments, the server 40 may further implement one or more actions associated with the selected options.

Thus, the server 40 may provide further information, generate another transportation assessment with modified criteria, generate or link a user account, facilitate a purchase, or generate or adjust a user insurance policy (e.g., a multimodal transportation insurance policy or an umbrella insurance policy). For example, the server 40 may generate documents for a new or modified insurance policy based upon the transportation assessment and a user selection associated with an option regarding such policy.

Such policy may be electronically reviewed, signed, paid, and enacted via a user interface associated with the presentation of the transportation assessment or via another user interface. Upon completion of review and any actions selected by the user, the user-specific transportation assessment may be stored for future review in some embodiments.

Other Matters

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

As used herein, unless otherwise indicated by context, the term "vehicle" refers to any type of powered or unpowered transportation device, which includes, but is not limited to, a car, truck, bus, train, motorcycle, bicycle, plane, or boat—including fully or partially self-driving (i.e., autonomous or semi-autonomous) vehicles. While a vehicle may be described herein as being controlled by an operator or insured individual, the aspects described herein also apply to autonomous vehicles or semi-autonomous vehicles, including vehicles that use software and/or hardware components to control aspects of vehicle operation or to assist a human driver in controlling aspects of vehicle operation. Such autonomous or semi-autonomous vehicles may be unmanned and/or operated remotely or in another suitable fashion, such as via controls other than the steering wheel, gear shift, brake pedal, and accelerator pedal.

With the foregoing, an insurance customer may opt-in to a rewards, insurance discount, or other type of program. In some aspects, customers may opt-in to a rewards, loyalty, or other program associated with multimodal transportation usage, such as a rewards program that collects data regarding user transportation mode usage. The customers may allow a remote server to collect sensor, telematics, vehicle, mobile device, and other types of data discussed herein. With customer permission or affirmative consent, the data collected may be analyzed to provide certain benefits to customers. For instance, insurance cost savings may be provided to lower risk or risk averse customers. Recommendations that lower risk or provide cost savings to customers may also be generated and provided to customers based upon data analysis, as discussed elsewhere herein.

The other functionality discussed herein may also be provided to customers in return for them allowing collection and analysis of the types of data discussed herein. In return for providing access to data, risk-averse insureds, vehicle owners, or vehicle occupants may receive discounts or insurance cost savings on transportation-related insurance, as well as home, renters, personal articles, and other types of insurance from the insurance provider.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., at a location of a mobile computing device or at a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Such memories may be or may include non-transitory, tangible computer-readable media configured to store computer-readable instructions that may be executed by one or more processors of one or more computer systems.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communicative) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, which may include improving the functioning of conventional computers in performing tasks.

What is claimed is:

1. A computer implemented method of monitoring multimodal transportation usage of a user, the method comprising:
    collecting, by one or more processors, geolocation data comprising a plurality of user locations and corresponding times associated with a user trip of the user;
    identifying, by the one or more processors, an area associated with the user trip based upon the geolocation data;
    receiving, by the one or more processors, transit route data associated with one or more transit route segments in the area, the transit route data including transit stopping points;
    determining, by the one or more processors and based upon the geolocation data, a plurality of locations at which the user stopped for at least a threshold time; and
    determining, by the one or more processors and based upon comparing the transit stopping points with the plurality of locations,
    a user route taken by the user, wherein the user route comprises at least one of the one or more transit route segments.

2. The computer implemented method of claim 1, further comprising:
    determining, by the one or more processors, a speed at which the user moves based upon the geolocation data; and
    identifying, by the one or more processors, the at least one of the one or more transit route segments in the user route based upon the speed at which the user moves.

3. The computer implemented method of claim 1, wherein: the one or more transit route segments include a plurality of road segments, and
    determining the user route further comprises identifying at least one of the plurality of road segments as a part of the user route by comparing the geolocation data with locations associated with the plurality of road segments.

4. The computer implemented method of claim 1, the method further comprising:
    receiving, by the one or more processors, user purchase history data indicating one or more electronic transactions of the user associated with transportation,
    wherein determining the user route is further based in part upon the one or more electronic transactions.

5. The computer implemented method of claim 4, wherein receiving user purchase history comprises accessing purchase transactions associated with a transportation account or payment source linked to the user.

6. The computer implemented method of claim 1, the method further comprising:
    determining, by the one or more processors, a transportation risk associated with the user route based at least in part upon risks associated with a transit mode, the transit mode being associated with the at least one of the one or more transit route segments in the user route.

7. The computer implemented method of claim 6, wherein determining the transportation risk comprises accessing environmental data to determine environmental conditions associated with the user route during the corresponding times associated with the user trip.

8. The computer implemented method of claim 1, the method further comprising:
    generating, by the one or more processors, a user transportation profile based upon user trip data, the user trip data comprising data associated with the user route and data associated with a plurality of additional user routes associated with additional user trips of the user, wherein
    the user transportation profile includes typical characteristics associated with user trips of the user, wherein the typical characteristics include at least one of typical times, typical locations, and typical transportation modes; and
    determining, by one or more processors, a user transportation risk associated with the user based upon the user transportation profile.

9. The computer implemented method of claim 8, the method further comprising:
    receiving, by the one or more processors, user profile data including information regarding assets of the user or insurance coverage levels associated with the user; and
    generating, by the one or more processors, a multimodal transportation insurance policy for the user based upon the user transportation profile and the user profile data.

10. A computer system for monitoring multimodal transportation usage of a user, the system comprising:
    one or more processors; and
    a program memory coupled to the one or more processors and storing executable instructions that, when execute by the one or more processors, cause the computer system to:
        collect geolocation data comprising a plurality of user locations and corresponding times associated with a user trip of the user;
        identify an area associated with the user trip based upon the geolocation data;
        receive transit route data associated with one or more transit route segments in the area, the transit route data including transit stopping points;
        determine, based upon the geolocation data, a plurality of locations at which the user stopped for at least a threshold time; and
        determine, based upon comparing the transit stopping points with the plurality of locations,
        a user route taken by the user, wherein the user route comprises at least one of the one or more transit route segments.

11. The computer system of claim 10, wherein the executable instructions further cause the computer system to:
    receive user purchase history data indicating one or more electronic transactions of the user associated with transportation, wherein
    determining the user route is based in part upon the one or more electronic transactions.

12. The computer system of claim 10, wherein the executable instructions further cause the computer system to:
    determine a transportation risk associated with the user route based at least in part upon risks associated with a transit mode associated with the at least one of the one or more transit route segments in the user route.

13. The computer system of claim 10, wherein the executable instructions further cause the computer system to:
    generate a user transportation profile based upon user trip data, the user trip data comprising data associated with the user route and data associated with a plurality of additional user routes associated with additional user trips, wherein the user transportation profile includes typical characteristics associated with user trips of the user, wherein the typical characteristics include at least one of typical times, typical locations, and typical transportation modes; and determine a user transportation risk based upon the user transportation profile.

14. The computer system of claim 13, wherein the executable instructions further cause the computer system to:

receive user profile data including information regarding assets of the user or insurance coverage levels associated with the user; and generate a multimodal transportation insurance policy for the user based upon the user transportation profile and the user profile data.

15. A tangible non-transitory computer-readable medium storing instructions for monitoring multimodal transportation usage of a user that, when executed by at least one processor of a computer system, causes the computer system to:

collect geolocation data regarding a plurality of user locations and corresponding times associated with a user trip of the user;

identify an area associated with the user trip based upon the geolocation data;

receive transit route data associated with one or more transit route segments in the area, the transit route data including transit stopping points;

determine, based upon the geolocation data, a plurality of locations at which the user stopped for at least a threshold time; and determine, based upon comparing the transit stopping points with the plurality of locations, a user route taken by the user, wherein the user route comprises at least one of the one or more transit route segments.

16. The tangible non-transitory computer-readable medium of claim 15, wherein the instructions further cause the computer system to:

determine a speed at which the user moves based upon the geolocation data; and identify the at least one of the one or more transit route segments in the user route based in part upon the speed at which the user moves.

17. The tangible non-transitory computer-readable medium of claim 15, wherein the transit route segments of the transit route data include a plurality of road segments and the instructions further cause the computer system to:

identify at least one of the plurality of road segments as a part of the user route by comparing the geolocation data with locations associated with the plurality of road segments.

18. The tangible non-transitory computer-readable medium of claim 15, wherein the instructions further cause the computer system to:

receive user purchase history data indicating one or more electronic transactions of the user associated with transportation; and determine the user route based in part upon the one or more electronic transactions.

19. The tangible non-transitory computer-readable medium of claim 15, wherein the instructions further cause the computer system to:

determine, based upon the at least one of the one or more transit route segments, a transportation risk associated with the user route; and generate, based upon the transportation risk, an insurance policy for the user.

20. The tangible non-transitory computer-readable medium of claim 15, wherein the instructions further cause the computer system to:

generate a user transportation profile based upon user trip data, the user trip data comprising data associated with the user route and data associated with a plurality of additional user routes associated with additional user trip; and determine a user transportation risk based upon the user transportation profile.

\* \* \* \* \*